United States Patent

Kobayashi et al.

Patent Number: 5,907,391
Date of Patent: May 25, 1999

[54] METHOD AND APPARATUS FOR ACCEPTING AN ORDER FOR PHOTOGRAPHIC PROCESSING

[75] Inventors: Kazuyoshi Kobayashi; Tsunehisa Obana; Yukio Yasuda, all of Tokyo, Japan

[73] Assignee: Fuji Photo Film Co., Ltd., Kanagawa-Ken, Japan

[21] Appl. No.: 08/399,963

[22] Filed: Mar. 6, 1995

[30] Foreign Application Priority Data

| Mar. 9, 1994 | [JP] | Japan | 6-038300 |
| Mar. 11, 1994 | [JP] | Japan | 6-041171 |
| Mar. 14, 1994 | [JP] | Japan | 6-042383 |

[51] Int. Cl.⁶ ............................... G03B 27/52
[52] U.S. Cl. ............................... 355/40; 355/41
[58] Field of Search ............... 355/27, 28, 29, 355/39, 40, 41, 77, 38

[56] References Cited

U.S. PATENT DOCUMENTS

| 4,039,258 | 8/1977 | Hujer et al. | 355/27 |
| 4,574,692 | 3/1986 | Wahli | 101/2 |
| 4,760,574 | 7/1988 | Budworth et al. | 371/5 |
| 4,800,406 | 1/1989 | Signoretto | 354/105 |
| 4,823,162 | 4/1989 | Renn et al. | 355/40 |
| 4,965,626 | 10/1990 | Robison et al. | 355/40 |
| 4,974,096 | 11/1990 | Wash | 358/302 |
| 5,021,820 | 6/1991 | Robison et al. | 355/40 |
| 5,119,126 | 6/1992 | Tokuda | 355/41 |
| 5,124,742 | 6/1992 | Yoshikawa | 355/27 |
| 5,159,385 | 10/1992 | Imamura | 355/28 |
| 5,229,810 | 7/1993 | Cloutier et al. | 355/40 |
| 5,281,993 | 1/1994 | Crochetierre et al. | 355/40 |
| 5,473,402 | 12/1995 | Long et al. | 354/298 |
| 5,508,783 | 4/1996 | Iwagaki et al. | 355/40 |

FOREIGN PATENT DOCUMENTS

| 3175448 | 7/1991 | Japan | G03D 13/00 |
| 4273238 | 9/1992 | Japan | G03C 1/00 |

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

When an order for photographic processing is placed from the customer, an operator, first, operates a keyboard to input the type of photographic processing ordered by the customer. Then, the operator causes a card reader to read customer identification information recorded on a card, and causes a bar code reader to read a bar code recorded on a cartridge and representing film information, and further, causes a film-data reading device to read film information magnetically recorded on the film. Further, when an order for extra prints is placed from the customer, the operator loads a print order slip on which information for extra prints is recorded, into a loading portion so that the information recorded on the print order slip is read by a mark-sheet reader. As a result, the information required for issuing order forms is obtained, and three sheets of order form for a customer, laboratory, and photo processing shop, are issued by a printer.

13 Claims, 22 Drawing Sheets

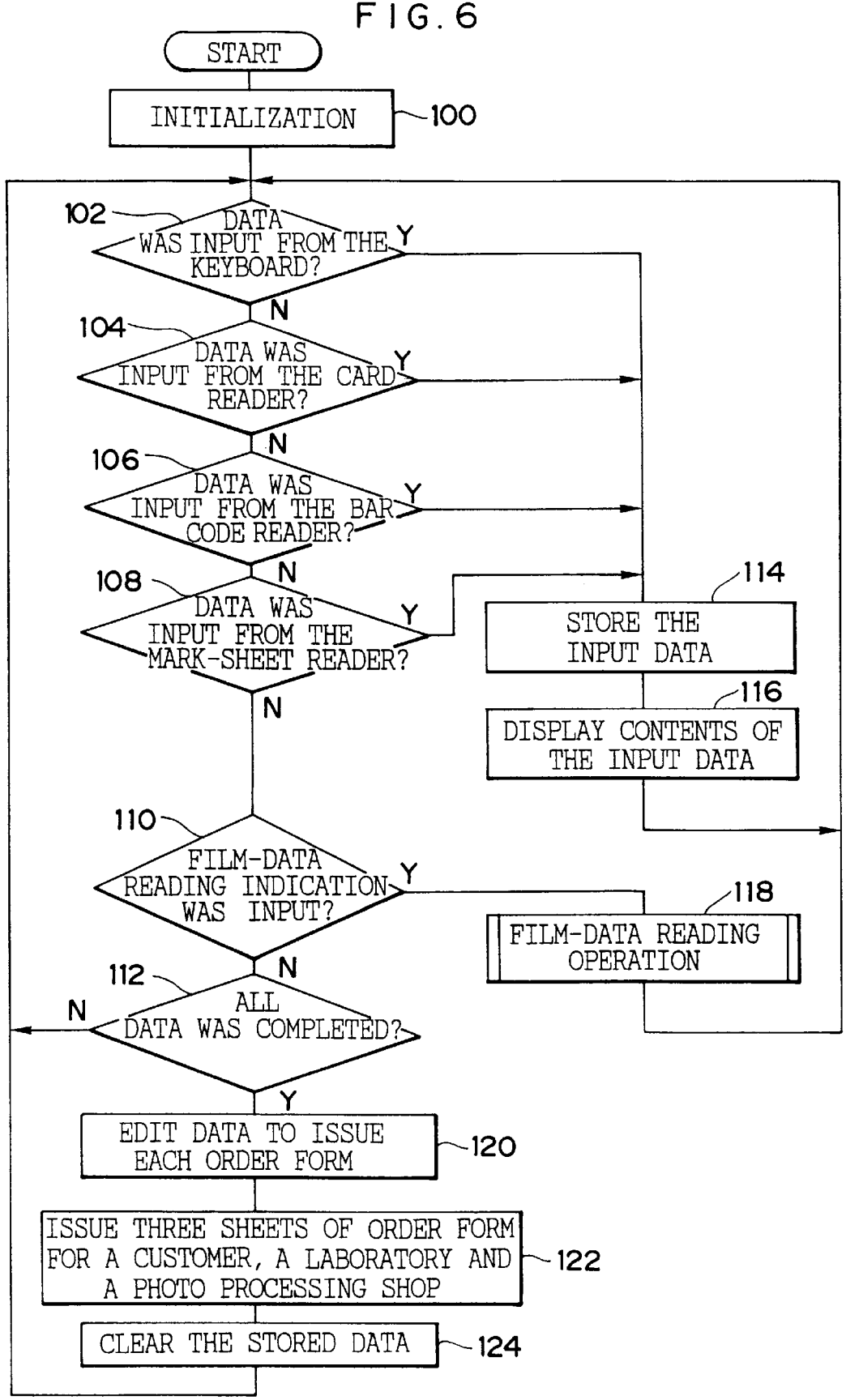

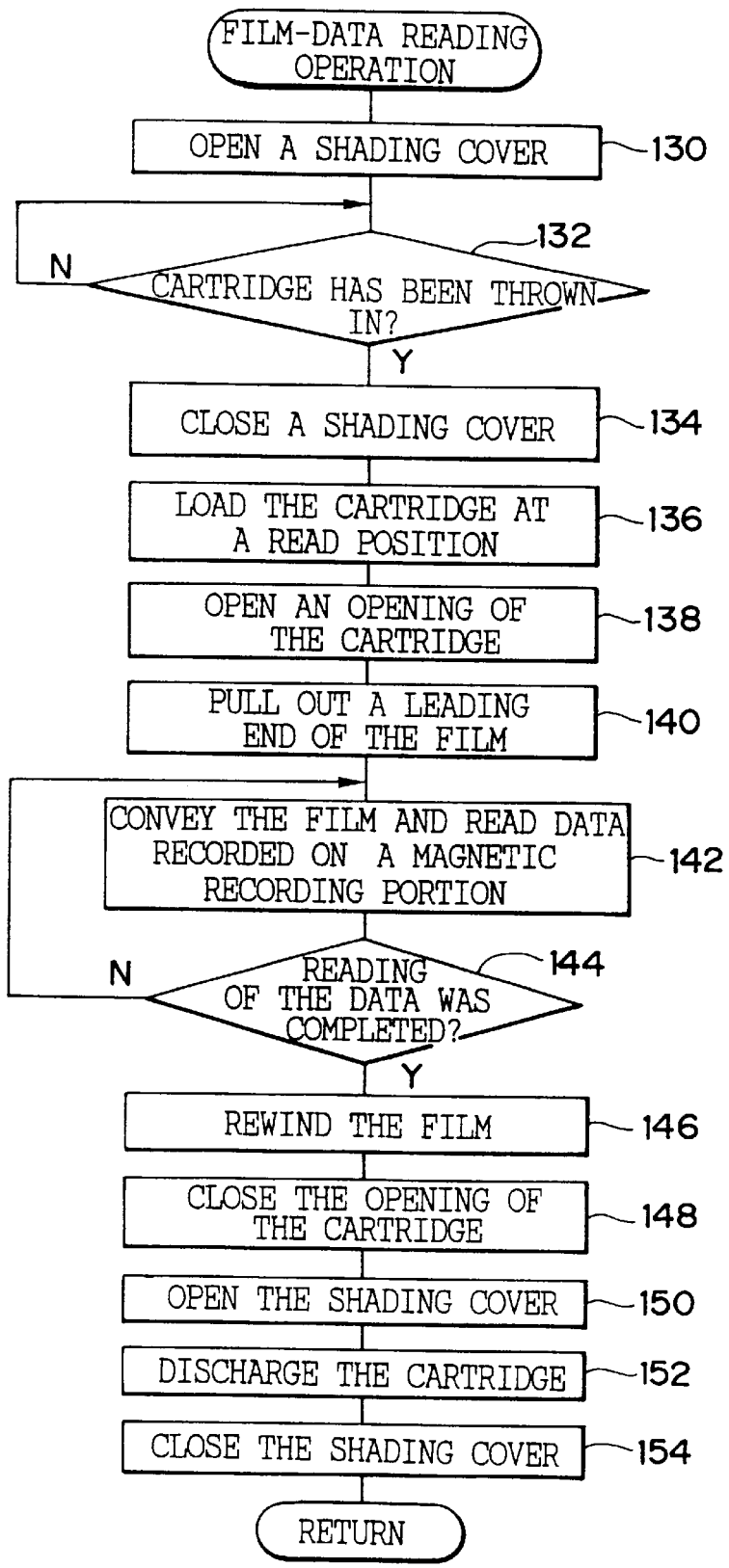

FIG. 8A

```
ORDER FORM FOR CUSTOMER
*ORDER-ACCEPTING DATE:      (MONTH)    (DATE),      (YEAR)
*ORDER-ACCEPTING NUMBER:
*NAME:
*TELEPHONE NUMBER:
*CONTENTS OF ORDER
      PROCESSING DIVISION:  SIMULTANEOUS PRINTS
      PRINTING PAPER:  SIZE L, NO EDGE, LUSTER
      NUMBER OF FILM:  TWO FILMS OF THIRTY-SIX FRAMES
*DATE BY WHICH PRINTS ARE EXPECTED TO BE FINISHED:
       (MONTH)    (DATE),      (YEAR)
```

FIG. 8B

```
ORDER FORM FOR PHOTO PROCESSING SHOP
*ORDER-ACCEPTING DATE:      (MONTH)    (DATE),      (YEAR)
*ORDER-ACCEPTING NUMBER:
*NAME:
*TELEPHONE NUMBER:
*CONTENTS OF ORDER
      PROCESSING DIVISION:  SIMULTANEOUS PRINTS
      FILM MANUFACTURER:  FUJI PHOTO FILM CO., LTD.
      PRINTING PAPER:  SIZE L, NO EDGE, LUSTER
      NUMBER OF FILM:  TWO FILMS OF THIRTY-SIX FRAMES
*DATE BY WHICH PRINTS ARE EXPECTED TO BE FINISHED:
       (MONTH)    (DATE),      (YEAR)
```

FIG. 8C

```
ORDER FORM FOR LABORATORY (ORDER CARD)
*ORDER-ACCEPTING DATE:      (MONTH)    (DATE),      (YEAR)
*ORDER-ACCEPTING NUMBER:
      PROCESSING DIVISION:  SIMULTANEOUS PRINTS
      FILM MANUFACTURER:  FUJI PHOTO FILM CO., LTD.
      PRINTING PAPER:  SIZE L, NO EDGE, LUSTER
      NUMBER OF FILM:  TWO FILMS OF THIRTY-SIX FRAMES
*EXPECTED DATE OF DELIVERY TO PHOTO PROCESSING SHOP:
       (MONTH)    (DATE),      (YEAR)
```

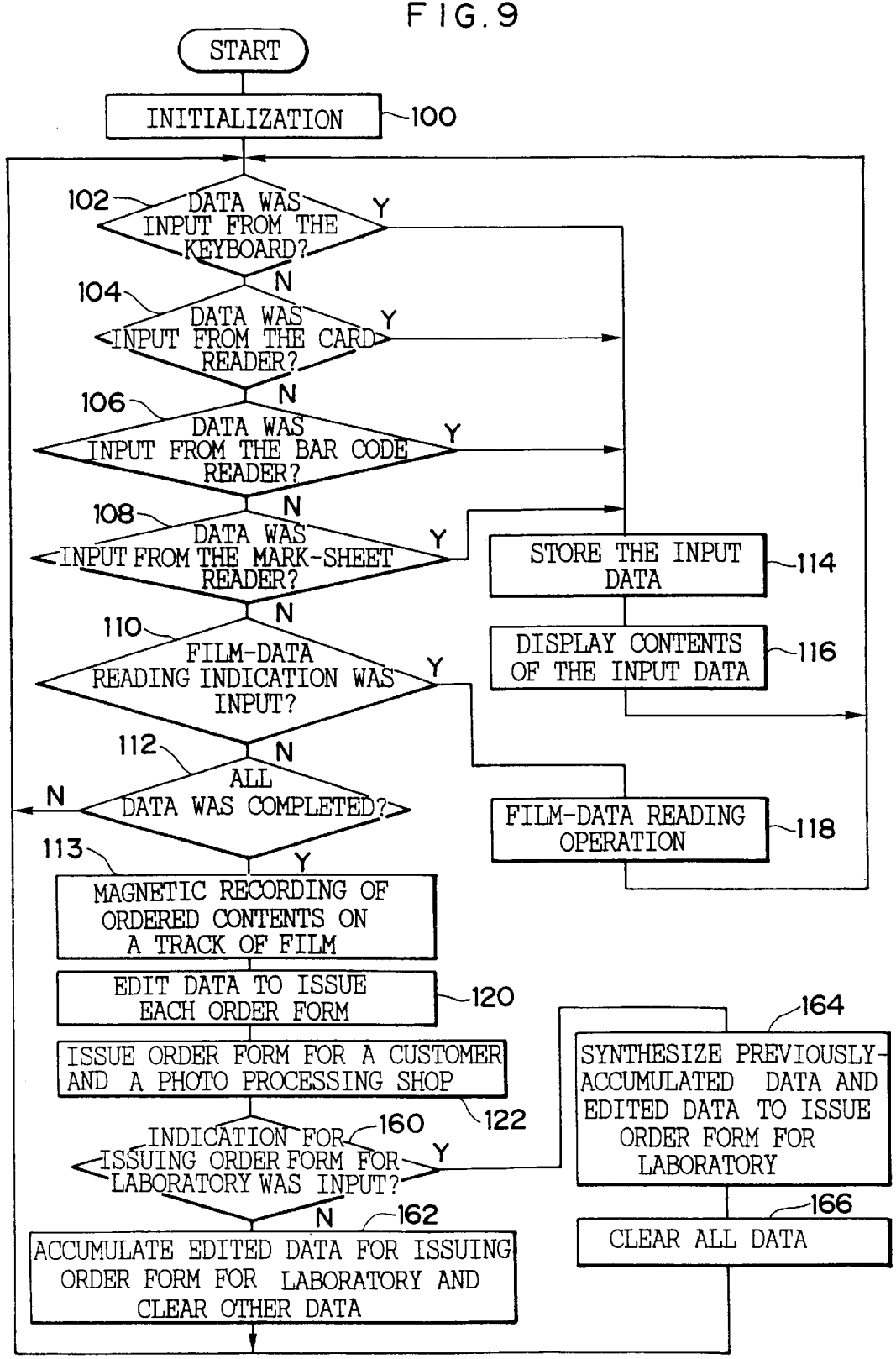

FIG. 10A

```
ORDER FORM FOR LABORATORY
*ORDER-ACCEPTING DATE:      (MONTH)   (DATE),      (YEAR)
*ORDER-ACCEPTING NUMBER:
    PROCESSING FIELD:  SIMULTANEOUS PRINTS
    FILM MANUFACTURER:  FUJI PHOTO FILM CO., LTD.
    PRINTING PAPER:  SIZE E, NO EDGE, SILK-FINISHED
    NUMBER OF FILM:  TWO FILMS OF THIRTY-SIX FRAMES
*EXPECTED DATE OF DELIVERY TO PHOTO PROCESSING SHOP:
         (MONTH)   (DATE),      (YEAR)
```

FIG. 10B

```
ORDER FORM FOR LABORATORY
*ORDER-ACCEPTING DATE:      (MONTH)   (DATE),      (YEAR)
*ORDER-ACCEPTING NUMBER:
    PROCESSING FIELD:  DEVELOPMENT
    FILM MANUFACTURER:  FUJI PHOTO FILM CO., LTD.
    NUMBER OF FILM:  ONE FILM OF TWENTY-FOUR FRAMES
*EXPECTED DATE OF DELIVERY TO PHOTO PROCESSING SHOP:
         (MONTH)   (DATE),      (YEAR)
```

FIG. 10C

```
ORDER FORM FOR LABORATORY
*ORDER-ACCEPTING DATE:      (MONTH)   (DATE),      (YEAR)
*ORDER-ACCEPTING NUMBER:
    PROCESSING FIELD:  EXTRA PRINTS
    FILM MANUFACTURER:  FUJI PHOTO FILM CO., LTD.
    PRINTING PAPER:  SIZE L, WITH EDGE, GLOSSY
    FRAMES FOR MAKING PRINTS: NO. @@@-ONE, NO. ###-THREE, .....
*EXPECTED DATE OF DELIVERY TO PHOTO PROCESSING SHOP:
         (MONTH)   (DATE),      (YEAR)
```

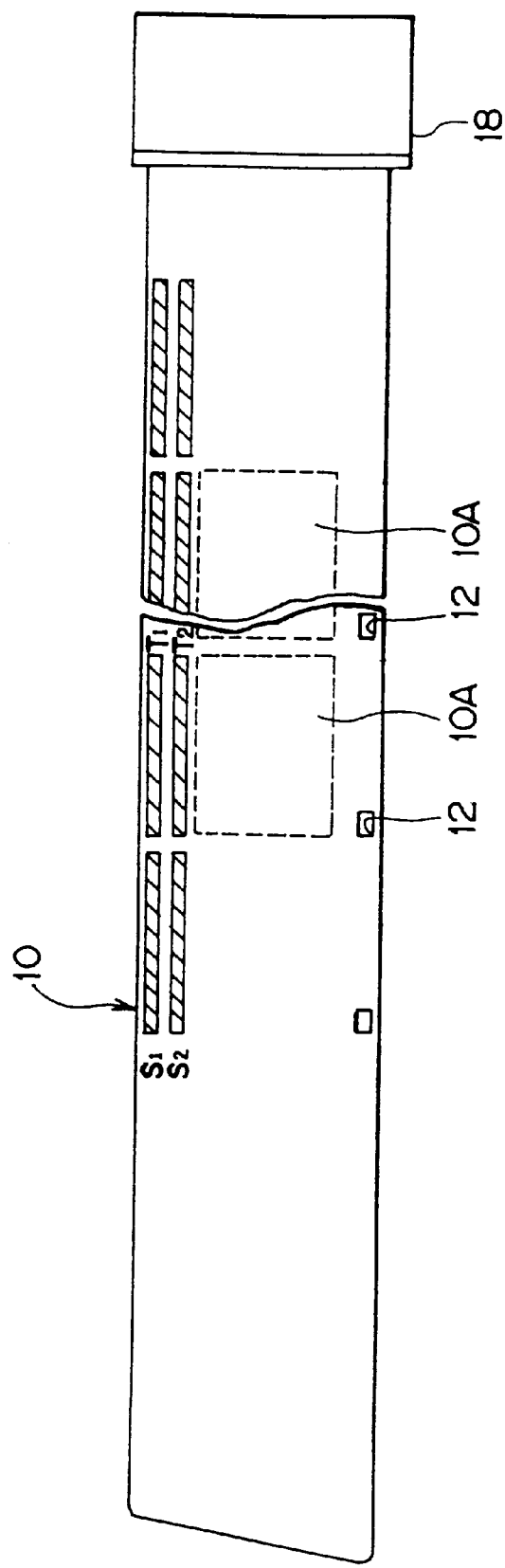

FIG. 17A

```
ORDER FORM FOR CUSTOMER
*ORDER-ACCEPTING DATE:    ____(MONTH) __(DATE), ____(YEAR)
*ORDER-ACCEPTING NUMBER:
*NAME:
*TELEPHONE NUMBER:
*CONTENTS OF ORDER
     PROCESSING DIVISION:  SIMULTANEOUS PRINTS
     PRINTING PAPER:  SIZE L, NO EDGE, GLOSSY
     NUMBER OF FILM:  TWO FILMS OF THIRTY-SIX FRAMES
*DATE BY WHICH THE PRINTS ARE EXPECTED TO BE FINISHED:
     ____(MONTH) __(DATE), ____(YEAR)
```

FIG. 17B

```
ORDER FORM FOR PHOTO PROCESSING SHOP
*ORDER-ACCEPTING DATE:    ____(MONTH) __(DATE), ____(YEAR)
*ORDER-ACCEPTING NUMBER:
*NAME:
*TELEPHONE NUMBER:
*CONTENTS OF ORDER
     PROCESSING DIVISION:  SIMULTANEOUS PRINTS
     FILM MANUFACTURER:  FUJI PHOTO FILM CO., LTD.
     PRINTING PAPER:  SIZE L, NO EDGE, GLOSSY
     NUMBER OF FILM:  TWO FILMS OF THIRTY-SIX FRAMES
*DATE BY WHICH THE PRINTS ARE EXPECTED TO BE FINISHED:
     ____(MONTH) __(DATE), ____(YEAR)
```

FIG. 17C

```
ORDER FORM FOR LABORATORY
*ORDER-ACCEPTING DATE:    ____(MONTH) __(DATE), ____(YEAR)
*ORDER-ACCEPTING NUMBER:
     PROCESSING DIVISION:  SIMULTANEOUS PRINTS
     FILM MANUFACTURER:  FUJI PHOTO FILM CO., LTD.
     PRINTING PAPER:  SIZE L, NO EDGE, GLOSSY
     NUMBER OF FILM:  TWO FILMS OF THIRTY-SIX FRAMES
*EXPECTED DATE OF DELIVERY TO PHOTO PROCESSING SHOP:
     ____(MONTH) __(DATE), ____(YEAR)
```

FIG.18

ORDER CARD FOR EXTRA PRINTS

| ENVELOPE NO. 84 | | | | CARTRIDGE NO. 86 | TOTAL NO. 88 |
|---|---|---|---|---|---|
| SIZE | FRAME NUMBER | | NUMBER OF ORDER PRINTS | | |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| ⟨L⟩⟨H⟩⟨P⟩ | ⟨1⟩⟨2⟩⟨3⟩⟨4⟩⟨5⟩⟨6⟩⟨7⟩⟨8⟩⟨9⟩⟨10⟩⟨20⟩⟨30⟩⟨40⟩ | | ⟨1⟩⟨2⟩⟨3⟩⟨4⟩⟨5⟩⟨6⟩⟨7⟩⟨8⟩⟨9⟩⟨10⟩⟨20⟩⟨30⟩⟨50⟩⟨70⟩ | EACH 1 ⟨2⟩ | ⟨CANCEL⟩ |
| 82A | 82B | | 82C | | |

FIG.19 ORDER CARD FOR EXTRA PRINTS

| 1 | 2 | 3 | 4 | 5 |
|---|---|---|---|---|
| 6 | 7 | 8 | 9 | 10 |
| "LIGHT" | "SOMEWHAT LIGHT" | "SOMEWHAT DARK" | "DARK" | |

FIG. 21

FIG. 22

METHOD AND APPARATUS FOR ACCEPTING AN ORDER FOR PHOTOGRAPHIC PROCESSING

BACKGROUND OF THE INVENTION

1. Field of the Invention

The present invention relates to a method and an apparatus for accepting an order for photographic processing, and particularly to a method and apparatus for accepting an order for photographic processing which is made by a customer (a user of a photographic film or the like).

2. Description of the Related Art

When a customer requests photographic processing such as development, making prints, and making extra prints, the customer brings a film or the like to be processed to a shop for accepting a photographic processing request (i.e., photo processing shop) and requests various photographic processing such as development, making prints simultaneously with development (referred to hereinafter as "simultaneous prints"), and making extra prints. The photo processing shop receives a film or the like which is brought in by the customer, and at the same time, asks the customer about their name and telephone number, and the contents of the requested photographic processing (e.g., development only, making prints simultaneous with development, or making extra prints, and when making prints is requested, a size of print, a kind of printing paper, or the like). Further, in the photo processing shop, a salesclerk enters, by handwriting, the information received from the customer, the expected date of delivery, and the like in an order form. In this way, the photo processing shop accepts a photographic processing request.

The above-described accepting order form is generally constructed of four sheets of paper. By entering various information in the order form by handwriting, the order form to be kept in the photo processing shop, a copy of the order form to be handed to the customer, another copy of the order form for placing the order for photographic processing with a laboratory (i.e., a development laboratory), and a statement of delivery are issued. The film received from the customer, or the like is sent to the laboratory together with the copy of the order form for placing the order for the above-described photographic processing. In the laboratory, a photographic processing operation in accordance with a customer's request is effected.

However, since entering various information in the order form is effected by handwriting as described above, an accepting operation of an order for photographic processing requires a great deal of time. For this reason, for example, if a large number of customers arrive at the same time many customers may be kept waiting for a long time. Further, since the information received from the customer is entered by handwriting, there is a possibility that errors occur. Moreover, there are also possibilities that, due to such errors, a film received from the customer cannot be returned to the customer properly, and the location of the film received from the customer becomes unclear. Further, in the laboratory, the requested contents may be misunderstood.

Further, designation of image frames for which the customer desires to make extra prints when extra prints are ordered is effected by directly entering a number of sheets or the like in a film package in which a film cut for several frames is contained. In this case, it is not possible to ascertain an exposure condition at the time of making prints simultaneous with development.

In the meantime, it has been proposed, in Japanese Patent Application Laid-Open No. 3-175448, that a film taken out from a cartridge serving as a container of the film and subjected to photographic processing such as development is returned to the cartridge and is returned to the customer. In this method, since the film is contained in the container when extra prints are ordered, it is difficult to correctly accept an order of extra prints of image frames for which the customer desires.

Further, when the customer orders extra prints at a later date, the customer brings a developed negative film to the photo processing shop and tells a salesclerk to make extra prints.

A developed negative film is usually contained in a semitransparent package called a negative sheet (strip) in strips cut every six frames. The customer positions the negative film at a standard position (i.e., arranges the negative film at a right-hand end of the negative sheet), and enters an ordering number of extra prints on the negative sheet through which a negative image can be viewed, by a felt-type pen or the like. In this way, the customer designates image frames of extra prints and the ordering number of extra prints for each image frame.

In accordance with this order, in the laboratory, an operator visually confirms the contents entered by the customer and operates an input button, which corresponds to the negative sheet, on an input device, so as to input an image frame for which extra prints are made.

However, when the customer designates an image frame, since an image of the negative film is small and the density and color of an image is reversed, it is a time-consuming work to retrieve an image frame for which the customer desires to make extra prints among similar images. Further, mistakes often occur.

On the other hand, in recent years, a frame number of each image frame is printed on a reverse side of a printing paper, and the customer records the printed frame number on a memo note or the like and brings this memo note together with the negative film to the photo processing shop. In this ordering method, it is not necessary to retrieve an image for which extra prints are ordered, among indistinct negative images, so that the customer is not likely to make a mistake of an order.

However, even if any of the above-described ordering methods are used, in the laboratory, an operator retrieves and inputs negative images for which the customer ordered extra prints. For this reason, due to an operational failure at the time of inputting, mistakes can occur. Further, this input operation is complicated and requires a great deal of time. Accordingly, the charge for making extra prints is comparatively higher than that for making prints simultaneously with development.

SUMMARY OF THE INVENTION

In view of the above-described circumstances, it is an object of the present invention to provide a method and an apparatus for accepting an order for photographic processing, which can efficiently and correctly accept an order for photographic processing from a customer.

It is another object of the present invention to provide a method and an apparatus for accepting an order for photographic processing, which makes it possible for a customer to easily order extra prints and makes it possible for an operator in a laboratory to easily confirm the contents ordered by the customer and which can prevent mistakes of orders simplify the operator's operation.

In order to achieve the above-described objects, a method for accepting an order for photographic processing according to a first aspect of the present invention comprises the steps of reading information relating to photographic processing, which is previously recorded on a film brought by a customer for photographic processing, or on a container in which the film is accommodated, and identification information for identifying the customer; and issuing an order form on which at least contents of the ordered photographic processing and the customer identification information are recorded in a state of being automatically readable, and transferring the order form to a laboratory.

Further, in order to achieve the above-described objects, an apparatus for accepting an order for photographic processing according to a second aspect of the present invention comprises: first reading means for reading information relating to photographic processing, said information being previously recorded on a film brought by a customer for photographic processing, or on a container in which the film is accommodated; second reading means for reading identification information for identifying the customer, said identification information being previously recorded on a recording medium brought by the customer; and issuing means which, using information read by the first reading means and the second reading means, issues at least a first order form to be handed to the customer, said first order form indicating that the order for photographic processing has been accepted, and a second order form used to communicate contents of the order for photographic processing to a laboratory.

A third aspect of the present invention is constructed in that, in the apparatus for accepting an order for photographic processing of the second aspect, the issuing means records an expected date of delivery of the order for photographic processing on the first order form and the second order form.

A fourth aspect of the present invention is constructed in that, in the apparatus for accepting an order for photographic processing of the second aspect, the issuing means records a size of completed prints on at least the second order form when the order for photographic processing includes making prints on a printing paper.

A fifth aspect (claim 5) of the present invention is constructed in that, in the apparatus for accepting an order for photographic processing of the second aspect, the issuing means issues a single second order form used to communicate contents of a plurality of orders for photographic processing from a plurality of customers, to the laboratory.

A sixth aspect of the present invention is constructed in that, in the apparatus for accepting an order for photographic processing of the second aspect, third reading means which reads information for specifying an image frame for extra prints, is further provided, said information being previously recorded on a print order slip brought by the customer when the customer orders for photographic processing for extra prints, and the issuing means records the information read by the third reading means, on at least the second order form when the accepted order for photographic processing is extra prints.

A seventh aspect of the present invention is constructed in that, in the apparatus for accepting an order for photographic processing of the sixth aspect, the print order slip is divided into a plurality of areas in which frame numbers corresponding to respective image frames of a photographic film are given, and any symbol or any number corresponding to a number of ordered prints can be entered in each of the plurality of areas.

An eighth aspect of the present invention comprises: fourth reading means for reading data for specifying a customer, said data being stored in a first storing medium; fifth reading means for reading a photographic processing condition for which the customer orders, said photographic processing condition being stored in a second storing medium; sixth reading means for reading information relating to photographic processing, said information being previously recorded on a film brought by the customer or on a container in which the film is accommodated; data filing means for determining an ID code for batching each information read by the fourth, fifth and sixth reading means, and filing a series of information on the basis of the ID code; printing means for printing the information filed in the data filing means; and printing control means for controlling the printing means such that all information corresponding to the ID code can be collectively printed.

A ninth aspect of the present invention is constructed in that the sixth reading means comprises a magnetic head for reading magnetic information recorded on a magnetic layer provided on the film, and said sixth reading means pulls out the film in a state in which the container is mounted to a predetermined position, and causes the magnetic head to correspond to the magnetic layer while conveying the film.

Tenth and eleven aspects of the present invention are constructed in that the apparatus for accepting an order for photographic processing of the eighth or ninth aspect is installed in a photo processing shop or a laboratory, and a network system for transmitting information by using a communication line is provided between the photo processing shop and the laboratory.

A twelfth aspect of the present invention comprises the steps of: preparing a predetermined order card divided into a plurality of areas in which frame numbers corresponding to respective image frames of a photographic film are given, and in each of which areas, any symbol or any number corresponding to a number of ordered prints can be entered; and accepting an order for photographic processing of extra prints from a customer in accordance with an ordered frame number and a number of ordered prints which are entered in the predetermined order card.

A thirteenth aspect of the present invention is constructed in that an arrangement of the areas provided in the predetermined order card is the same as that of an index print which is to be handed to the customer together with the photographic film.

The first aspect of the present invention comprises the step of reading the information relating to photographic processing, which is previously recorded on the film brought by the customer which orders for photographic processing, or the container in which the film is accommodated, and the identification information for identifying the customer, and issuing the order form on which at least this information is recorded in a state of being automatically readable. In the laboratory, the operator can confirm the contents of the order by mechanically and automatically reading the order form, and misunderstanding of the ordered contents can be prevented.

According to the second aspect of the present invention, the information relating to photographic processing is previously recorded on the film brought by the customer for photographic processing, or the container in which the film is accommodated. This information is read by the first reading means. Further, the customer brings the recording medium on which the identification information for identifying the customer is previously recorded, and the information recorded on the recording medium is read by the second reading means. As described above, since a portion or all of the information necessary for accepting the order for photographic processing and issuing the order forms is acquired, the issuing means issues, using each information read by the first reading means and the second reading means, at least the first order form indicating that the order for photographic processing has been accepted, and the second order form used to communicate contents of the order for photographic processing to the laboratory.

In this way, a portion or all of the necessary information is obtained by causing the first reading means and the second reading means to read the information recorded on the film or the container and the information recorded on the recording medium, respectively, and the first order form and the second order form are automatically issued by the issuing means. For this reason, it is not necessary to ask the customer all necessary information and to write it down to issue the order forms. Accordingly, it becomes easy to accept an order for photographic processing and it is possible to efficiently accept the order for photographic processing from the customer. In addition, it is possible to prevent errors.

Meanwhile, when the shop for accepting an order for photographic processing, in which the apparatus for accepting an order for photographic processing according to the present invention is installed, and the laboratory in which photographic processing is effected, are located at the same place, it suffices that the issuing means issues only the first and second order forms. On the other hand, when the shop for accepting an order for photographic processing and the laboratory are located separately, it is preferable that, in addition to the first and second order forms, the issuing means issues a third order form as a copy of the order form to be kept in the shop for accepting an order for photographic processing. As a result, it is possible to determine whether or not prints have been completed according to the customer's order by referring to the third order form kept in the shop for accepting an order for photographic processing when the prints are completed.

Further, it is preferable that, as described in the third aspect of the present invention, the issuing means also records the expected date of delivery of completed prints on the first order form and the second order form. As a result, since the user and the operator in the laboratory can both easily confirm the expected date of delivery of completed prints by referring to the issued order forms, it is possible to prevent a situation in which the ordered photographic processing is not finished by the expected date of delivery because the expected date of delivery was not correctly communicated to the laboratory, and in which the customer may go to the shop many times to receive the prints of the completed photographic processing because, for example, the customer forgets the date by which the prints are expected to be finished.

Further, as described in the fourth aspect of the present invention, it is preferable that the issuing means records the size of completed prints on at least the second order form when the order for photographic processing includes making prints on the printing paper. As a result, since the operator in the laboratory can easily confirm the size of completed prints by referring to the issued second order form, it is possible to prevent prints of incorrect print size because the ordered size of completed prints was not be correctly communicated to the laboratory.

Still further, as described in the fifth aspect of the present invention, it is preferable that issuing means issues the single second order form used to communicate contents of a plurality of orders for photographic processing from a plurality of customers to the laboratory. As a result, in the laboratory, it is possible to confirm the contents of the plurality of orders for photographic processing from the plurality of customers by referring to the issued second order slip. This makes it possible to easily confirm the contents of a large number of orders for photographic processing overall.

Further, as described in the sixth aspect of the present invention, it is preferable that the print order slip is provided in which the information for specifying the image frames for ordered extra prints is recorded, and the information recorded on the print order slip brought by the customer when the customer orders for photographic processing for extra prints, is read by the third reading means. In addition, the issuing means records the information read by the third reading means, on at least the second order form when the accepted order for photographic processing is extra prints.

As a result, it is possible for the customer to designate the image frames for extra prints to be ordered only by recording the information which specifies the image frames, on the print order slip. When, at the time of accepting the order for photographic processing, the information is read by the third reading means, the image frames for extra prints ordered from the customer are correctly confirmed and recorded on the second order form. Accordingly, even though, at the time of accepting an order for photographic processing, the film is accommodated in the container, it is possible to correctly accept an order for extra prints from the customer, so that the image frames for ordered extra prints are correctly communicated to the laboratory by the second order form.

According to the eighth aspect of the present invention, when the customer places an order for photographic processing, the information specifying the customer (customer's name and telephone number), the photographic processing condition (simultaneous prints, reorder or the like), and the information relating to photographic processing (designating image frames, number of ordered prints, or the like) are required. The fourth reading means reads information (i.e., customer specifying information) recorded on, for example, a registration card carried by the customer (which may be issued by the photo processing shop, or may be a credit card generally used). Further, the fifth reading means reads, in a case of reorder for extra prints, the specified image frames and the number of ordered prints, which are stored in the card of "mark-sheet" type, previously checked by the customer. The sixth reading means reads the information relating to photographic processing such as a DX code or the like, which is previously stored in the container or the film.

This information is processed as a series of information and is filed by the data filing means on the basis of the determined ID code.

The printing control means prints, for example, by a key input operation of the ID number, all information corresponding to the ID number, while controlling the printing means. As a result, it is not necessary to enter the ordered contents by handwriting in the photo processing shop or the laboratory, and a lot of time is saved. In addition, misunderstanding of the ordered contents is prevented.

Further, since the printed contents are respectively kept by the customer, photo processing shop and the laboratory, the ordered contents can be reliably collated.

According to the ninth aspect of the present invention, the magnetic layer is provided on the film, and, for example, photographing conditions at the time of photographing each image frame (i.e., exposure, shutter speed or the like), or exposure conditions at the time of simultaneous prints are recorded on the magnetic layer. In the photo processing shop, by mounting the container in which the film is accommodated to a predetermined position and pulling out the film, the magnetic head corresponds to the magnetic layer so that the information recorded on the magnetic layer is read. As a result, when the customer orders extra prints, a printing operation can be effected on the same conditions as those at the time of simultaneous prints, so that inconsistencies can be alleviated.

According to the tenth and eleventh aspects of the present invention, since the apparatus for accepting an order for photographic processing is installed in the photo processing shop and the laboratory and a network system for transferring information by using a communication line is provided between the photo processing shop and the laboratory, the ordered contents can reliably be communicated to the laboratory and it is possible to reliably collate the ordered contents with the container actually received from the photo processing shop.

In the twelfth aspect of the present invention, a card (order card) for an order for extra prints is previously prepared in the photo processing shop or the like. Then, the customer brings the negative film to the photo processing shop and enters the contents of extra prints on this order card.

The order card is divided into a plurality of areas in which frame numbers are given, and the number of ordered prints is entered in the area in which the corresponding frame number is given, by using a symbol or a number. When the order card is a card of, for example, a so-called "mark-sheet" type, in the laboratory, the ordered contents can be input only by inserting the card into a "mark-sheet" reading machine.

In this way, the customer can easily order extra prints because the order card for extra prints is previously prepared, and the input operation of the ordered contents in the laboratory can be automated. For this reason, working efficiency improves and an input error can be prevented.

According to the thirteenth aspect of the present invention, when the negative film and printing papers are returned to the customer after, for example, simultaneous prints have been completed, the index print is also given to the customer. The arrangement of the order card is constructed in the same manner as that of images recorded on the index print. Therefore, it is possible for the customer to specify the desired image frame while viewing the index print even when the frame numbers are difficult to specify.

BRIEF DESCRIPTION OF THE DRAWINGS

The invention will now be described with reference to the accompanying drawings wherein:

FIG. 6 is a flow chart for illustrating, as an operation of the first embodiment, an operation effected in the apparatus for accepting an order for photographic processing;

FIG. 7 is a flow chart for illustrating a film-data reading operation effected in the apparatus for accepting an order for photographic processing;

FIGS. 8A through 8C are image views illustrating examples of format of respective order forms, wherein FIG. 8A shows an order form for a customer, FIG. 8B shows an order form for a photo processing shop, and FIG. 8C shows an order form for a laboratory;

FIG. 9 is a flow chart for illustrating another example of operation effected in the apparatus for accepting an order for photographic processing;

FIGS. 10A through 10C are image views illustrating examples of format of the order form for the laboratory, issued by the operation in FIG. 9;

FIG. 11 is a plan view of a film according to a second embodiment of the present invention;

FIGS. 17A through 17C are image views illustrating examples of format of respective order forms, wherein FIG. 17A shows an order form for a customer, FIG. 17B shows an order form for a photo processing shop, and FIG. 17C shows an order form for a laboratory;

FIG. 18 is a plan view of an order card (the first card);

FIG. 19 is a plan view of an order card (the second card) as a modified example of FIG. 18;

FIG. 21 is a plan view of an index print; and

FIG. 22 is a plan view illustrating one block of another order card (the fourth card).

DESCRIPTION OF THE PREFERRED EMBODIMENTS

Referring now to the accompanying drawings, a detailed description will be given of the embodiments of the present invention.

Figure 1:
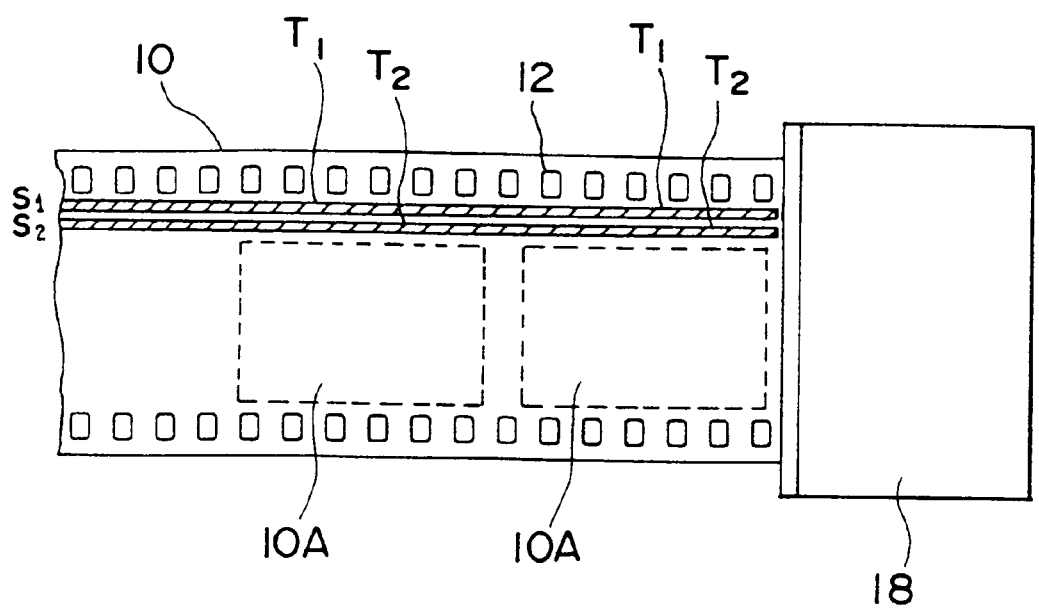
FIG. 1 is a plan view of a film according to a first embodiment of the present invention.

FIG. 1 shows a film 10 according to a first embodiment of the present invention. It should be noted that the film 10 of this embodiment includes a negative film and a positive film, and also includes a color film and a black-and-white film.

An emulsion is applied to one side of an elongated base of the film 10 so that an emulsion layer is formed thereon. An image frame 10A is exposed and recorded on the emulsion layer by an unillustrated camera. Perforations 12 are disposed along a longitudinal direction of the film 10 at lateral-directional end portions thereof.

Further, a transparent magnetic material which is equivalent to that described, for example, in Japanese Patent Application Laid-Open No. 4-273238 or U.S. Pat. No. 4,974,096, is applied to the side of the film 10 which is opposite to the side on which the emulsion layer is formed, and magnetic tracks S1, S2 are formed between the perforations 12 and the image frames 10A. Different film information such as the type of film, DX code, manufacturer, date of manufacture, or the like, is previously recorded for each film on these tracks S1, S2 at the time of manufacturing films. When an image of the image frame 10A is printed on a printing paper, the film information is used to set a printing condition when a channel is selected. Different photographing information for each image frame 10A, for example, a photographing date, the kind of light source, an aspect ratio of an image, photographing magnitude, a top side of an image and the like, is recorded on the tracks S1, S2 by a camera having a function of magnetically recording information. The photographing information is read when the image of the image frame 10A is printed on the printing paper, and the read information is used for, for example, correction of a printing condition.

Figure 2:
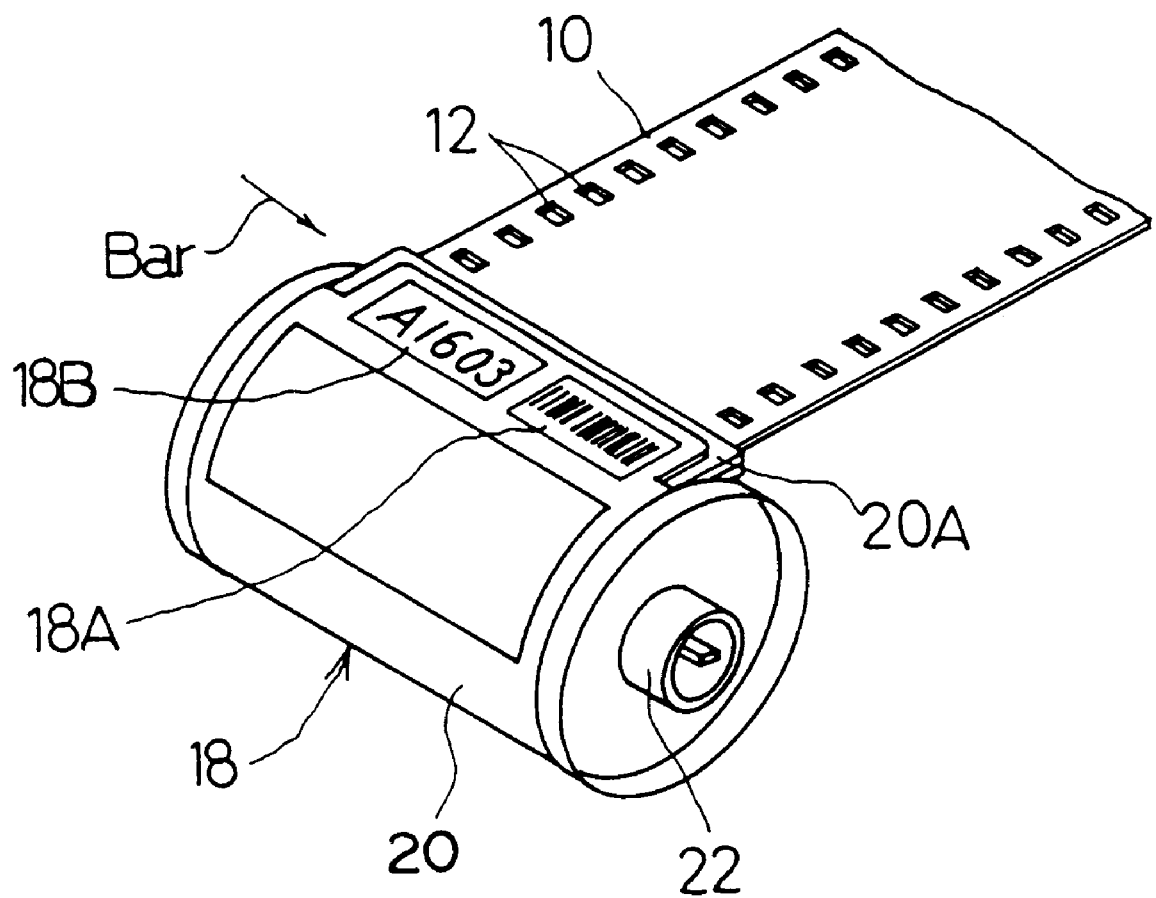
FIG. 2 is a perspective view of a cartridge according to the first embodiment.

As shown in FIG. 2, a film case 18 as a container of the present invention (which is referred to hereinafter as a cartridge 18 in order to distinguish it from a general film case) is formed from a substantially cylindrical cartridge main body 20 and a spool 22 rotatably supported within the cartridge main body 20. Meanwhile, as this cartridge 18, one described in Japanese Patent Application Laid-Open No. 3-175448 can be used.

An opening is formed at an end portion of a protruding portion 20A which protrudes from the cylindrical portion of the cartridge main body 20 in a tangential direction thereof, so that the film 10 can pass through.

A fastening portion (not shown) is provided on the spool 22 and a rear end portion of the film 10 is fastened to the fastening portion so as to be removable. A shutter 27A (see FIG. 4) is provided in the opening of the protruding portion 20A. The shutter 27A opens when the film 10 is wound and pulled out, and closes when the film 10 is contained in the cartridge 18.

Further, a bar code 18A and a numeral 18B, which represent the above-described film information and cartridge identifying information for identifying each cartridge 18, are recorded in the cartridge 18 at a position indicated by arrow "Bar" in FIG. 2 on an outer periphery of the cartridge main body 20.

Figure 3:
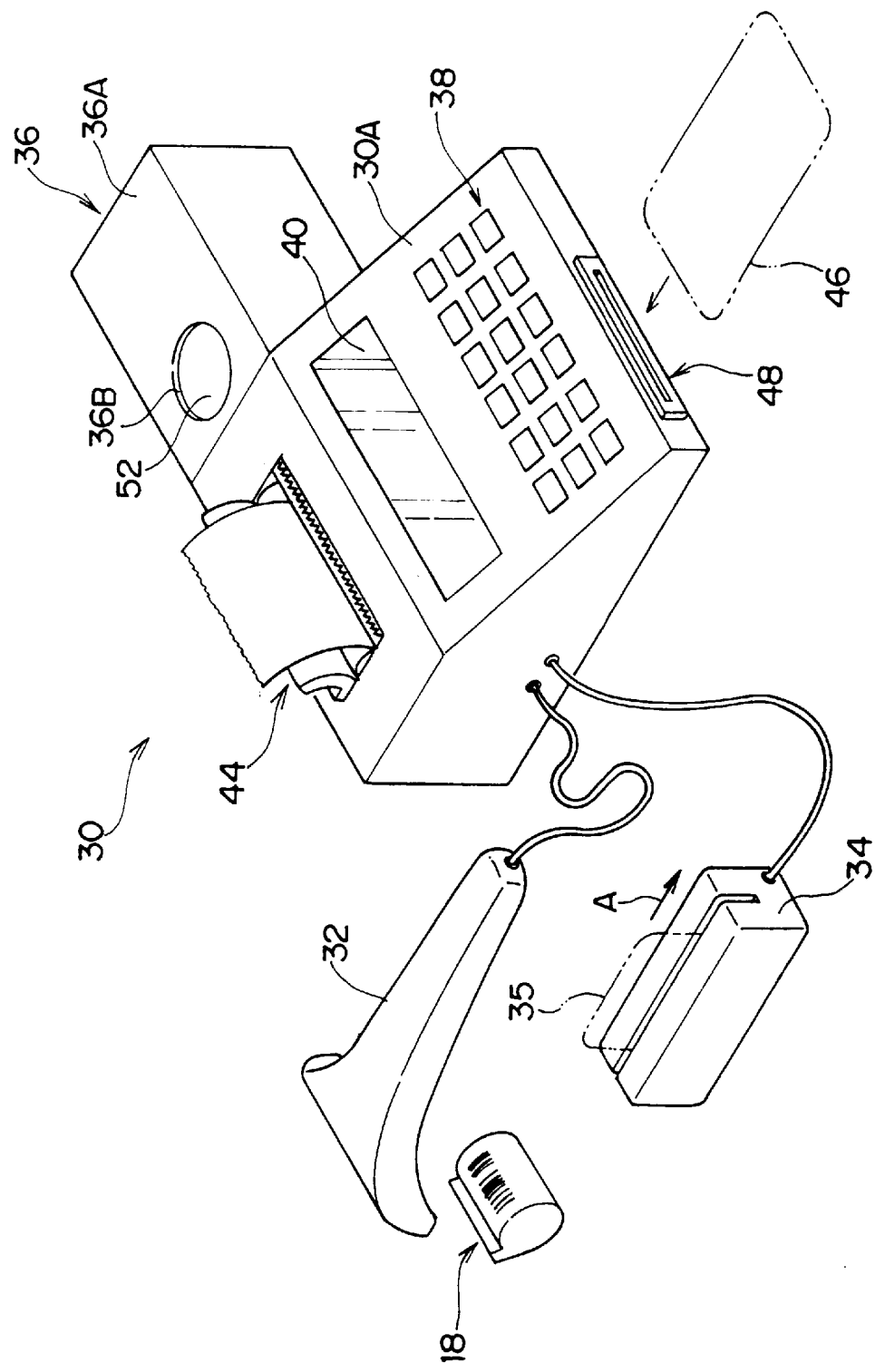
FIG. 3 is a perspective view illustrating an exterior of an apparatus for accepting an order for photographic processing according to the first embodiment.
Figure 5:
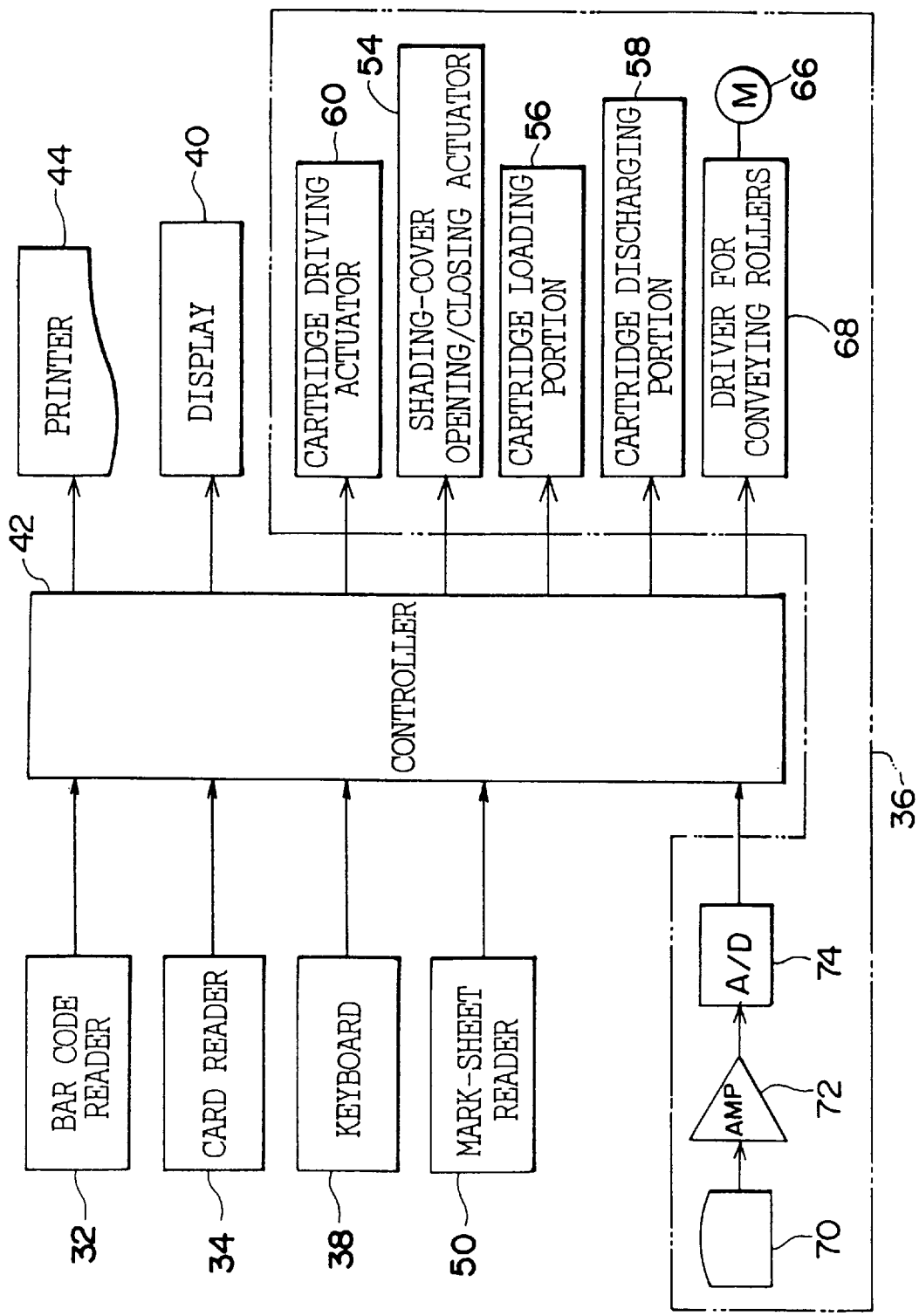
FIG. 5 is a block diagram illustrating a schematic structure of the apparatus for accepting an order for photographic processing.

Next, a description will be given of an apparatus for accepting an order for photographic processing according to the present invention, which is to be installed in a photo processing shop or the like. As shown in FIG. 3, the apparatus for accepting an order for photographic processing 30 is formed from a main body accommodated in a casing 30A, a bar code reader 32, a card reader 34 and a film data reading device 36 separated from the casing 30A. An upper surface of the casing 30A is partly inclined, and a keyboard 38 and a liquid crystal display 40 are provided on this inclined surface. The keyboard 38 and the display 40 are respectively connected to a controller 42 (see FIG. 5) which is provided within the casing 30A and is formed by a micro computer or the like. The keyboard 38 permits input of various data and indications by an operator to the controller 42, and the display 40 displays various data in accordance with the indications from the controller 42.

Further, a printer 44 which forms an issuing means of the present invention together with the controller 42, is provided on a horizontal portion of the upper surface of the casing 30A. The printer 44 is connected to the controller 42 and prints various information on a recording paper in the form of a roll in accordance with the indications from the controller 42. A loading portion 48 for loading a print order slip 46 (see FIG. 3) is provided on a side surface of the casing 30A. The print order slip 46 is used to inform the photo processing shop of image frames for which a customer desires to make extra prints when the customer orders extra prints. On the print order slip 46, information which specifies image frames of ordered extra prints is recorded as marks by the customer in a so-called "mark-sheet" system (in which dots or blank spaces are marked). A mark-sheet reader 50 (see FIG. 5) which serves as a third reading means of this embodiment is provided within the loading portion 48. The mark-sheet reader 50 can read marks recorded on the print order slip 46 when an operator loads the print order slip 46 into the loading portion 48. The mark-sheet reader 50 is connected to the controller 42 and outputs information which the read mark represents, to the controller 42.

Meanwhile, the bar code reader 32 corresponds to a first reading means of this embodiment, and can read a bar code when the operator which accepts an order for photographic processing, operates it so as to cause a reading portion provided at a leading end portion of the bar code reader 32 to correspond to the bar code. The bar code reader 32 is connected to the controller 42 (see FIG. 5), and outputs data which the read bar code represents, to the controller 42. Incidentally, the customer which places an order for photographic processing with the photo processing shop, brings a card 35 (see FIG. 3) to which a magnetic tape is previously attached and identification information for identifying each customer (e.g., a name and a telephone number of the customer) is magnetically recorded on the magnetic tape. The card reader 34 corresponds to a second reading means of this embodiment. When the card 35 is loaded into the card reader 34 by the operator and is moved in a direction of arrow A in FIG. 3, the identification information magnetically recorded on the card can be read. The card reader 34 is connected to the controller 42 and outputs the read identification information to the controller 42.

A film-data reading device 36 also corresponds to the first reading means of this embodiment. The film-data reading device 36 has an opening 36B provided on an upper surface of the casing 36A and a shading cover 52 provided within the casing 36A so as to correspond to the opening 36B. The shading cover 52 is adapted so as to be slidable by a shading lid-opening/closing actuator 54 (see FIG. 5) to a position in which the shading cover 52 closes the opening 36B (see FIG. 3) or a position in which the shading cover 52 opens the opening 36B. The shading-cover opening/closing actuator 54 is connected to the controller 42 and opens or closes the shading cover 52 in accordance with the indications from the controller 42.

A cartridge loading portion 56 (see FIG. 5) is disposed within the casing 36A at a position which corresponds to the opening 36B. The cartridge 18 thrown into the casing 36A via the opening 36B in an open state is transferred to the cartridge loading portion 56 and is set in a read position shown in FIG. 4. The cartridge 18 after a reading operation ends is moved out from the read position and discharged outside from the casing 36A via the opening 36B by a cartridge discharging portion 58 (see FIG. 5). The cartridge loading portion 56 and the cartridge discharging portion 58 are respectively connected to the controller 42 so as to effect the above-described operations in accordance with the indications from the controller 42.

Further, a cartridge driving actuator 60 is disposed within the film-data reading device 36 in the vicinity of the read position. The cartridge driving actuator 60 is connected to the controller 42 (see FIG. 5) and rotates the spool 22 of the cartridge 18 in a direction of arrow B or a direction opposite thereto in accordance with the indications from the controller 42. Further, a cam is rotated via the shutter 27A of the cartridge 18 in accordance with the indications from the controller 42. A pair of conveying rollers 62 is provided at a position which corresponds to an opening of the cartridge 18 located at the read position. A pair of conveying rollers 64 is provided at a downstream side of the pair of conveying rollers 62 at a predetermined interval. Each pair of conveying rollers 62, 64 rotates by means of a driving force of a pulse motor 66 (see FIG. 5) being transmitted thereto and conveys the film 10. The pulse motor 66 is connected to the controller 42 via a driver 68 for conveying rollers and rotates each pair of conveying rollers 62, 64 in a predetermined direction or a direction opposite thereto in accordance with the indications from the controller 42.

A reading head 70 is provided between the pair of conveying rollers 62 and the pair of conveying rollers 64 so as to correspond to the track of the film 10. The reading head 70 is connected to the controller 42 via an amplifier 72 and an A/D converter 74 (see FIG. 5). The information recorded on the track is read by the reading head 70 when the film 10 is being conveyed, and is converted to digital data to be output to the controller 42. Further, a shaft 76 is disposed at a downstream side of the pair of conveying rollers 64 at a predetermined interval therefrom. The outer peripheral side of the shaft 76 is demarcated by a guide 78 provided at a position apart from the shaft 76 by a predetermined distance, so that an accommodating portion 80 for temporarily accommodating the film is formed therein.

Next, an operation of the first embodiment will be described by referring to flow charts shown in FIG. 6 and FIG. 7. First, by referring to the flow chart in FIG. 6, a description will be given of a main process to be performed in the apparatus for accepting an order for photographic processing 30. It should be noted that the process shown in FIG. 6 is effected in the controller 42 when the apparatus for accepting an order for photographic processing 30 is turned on.

In step 100, in order to effect initialization, the bar code reader 32 and the card reader 34 are actuated, and at the same time, an unillustrated memory of the controller 42 is cleared. Further, the current date is fetched from a timer built in the controller 42. In step 102, it is determined whether or not data has been input from the keyboard 38. When a decision of step 102 is no, in step 104, it is determined whether or not data has been input from the card reader 34. When a decision of step 104 is no, in step 106, it is determined whether or not data has been input from the bar code reader 32.

When a decision of step 106 is also no, in step 108, it is determined whether or not data has been input from the mark-sheet reader 50. When a decision of step 108 is also no, in step 110, it is determined whether or not film-data reading indication has been input by an operator operating the key board 38. When a decision of step 110 is also no, in step 112, it is determined whether or not all data necessary for issuing order forms described below has been completed. When a decision of step 112 is also no, the process returns to step 102, and steps 102 through 112 are repeated until any one of steps 102 through 112 is decided for yes.

On the other hand, when the customer orders for photographic processing, the customer brings the cartridge 18 in which the film 10 to be processed is contained, and the card 35 (and when the customer orders prints, the customer also brings the print order slip 46) to the photo processing shop, and tells the operator of the type of photographic processing which the customer orders (e.g., development, "simultaneous prints", making extra prints, and the like), and at the same time, hands the cartridge 18, the card 35, or the like to the operator. Thus, the operator first operates the keyboard 38 and inputs the type of ordered photographic processing. Next, the operator sets the card 35 in the card reader 34 so that information recorded in the card 35 is read, and thereafter, returns the card 35 to the customer. Then, the operator causes the bar code reader 32 to read a bar code recorded in the cartridge 18 and indicates reading of the information magnetically recorded on the track of the film 10. Further, in the case in which extra prints are ordered, the operator loads the print order slip 46 in the loading portion 48 and causes the mark-sheet reader 50 to read information recorded on the print order slip 46.

As described above, in the apparatus for accepting an order for photographic processing 30, when the decision of step 102 is yes, in step 114, input data (in this case, the type of ordered photographic processing) is stored in the memory. In step 116, the contents of the input data is displayed on the display 40 and the process returns to step 102. As a result, the operator can confirm the contents of the input data by the display 40. Meanwhile, the contents of all data to be decided in the above-described step 112 change in accordance with the input type of photographic processing. For example, when "simultaneous prints" is ordered, the above-described step 112 is not decided for yes unless data such as a print size is input. Further, for example, when extra prints have been ordered, the above-described step 112 is not decided for yes unless data which specifies an image frame for extra prints is input.

Next, when data read from the card 35 is input from the card reader 34, a decision of step 104 is yes, and in step 114, the input data is stored in the memory, and at the same time, in step 116, the contents of the input data is displayed on the display 40. Next, when the bar code data recorded in the cartridge 18 is input from the bar code reader 32, the decision of step 106 is yes, and in the above-described manner, the input data is stored in the memory (step 114), and the contents of the input data is displayed (step 116). Meanwhile, when the data input to the controller 42 is abnormal due to an operational failure of the keyboard 38, a read error of the bar code reader 32 or the card reader 34, or the like, the abnormal input data is detected by the operator confirming the contents displayed on the display 40. Then, various information is repeatedly input until the operator determines that the input data is normal, and data stored in the memory is updated each time information is input.

Next, when a film-data reading indication is input by the operator, a decision of step 110 is yes, and in step 118, a film-data reading operation is effected. The film-data reading operation will be described by referring to the flow chart shown in FIG. 7. In step 130, a shading cover 52 slides by the shading-cover opening/closing actuator 54 so that the opening 36B is opened. Step 132 determines whether or not the cartridge 18 has been thrown in. When a decision of step 132 is yes, in step 134, the shading cover 52 slides by the shading-cover opening/closing actuator 54 so that the opening 36B is closed. As a result, an interior of the casing 36A of the film-data reading device 36 becomes light tight.

In the next step 136, the cartridge 18 is loaded at a read position by the cartridge loading portion 56. In step 138, an opening of the cartridge 18 is opened by the cartridge driving actuator 60. Next, in step 140, the spool 22 is rotated in the direction of arrow B in FIG. 4 by the cartridge driving actuator 60, a leading end portion of the film 10 is pulled out from the cartridge 18, and the film 10 is caught by each pair of conveying rollers 62, 64.

In step 142, the pulse motor 66 is driven via a driver 68 for conveying rollers and the film 10 is conveyed by each pair of conveying rollers 62, 64 in a direction in which the film 10 is pulled out. At the same time, the information recorded on the tracks S1, S2 of the film 10 is read by the reading head 70. Step 144 determines whether or not reading of the tracks S1, S2 has been completed. The process of step 142 is continuously effected until a decision of step 144 is decided for yes. Meanwhile, at the same time of conveyance of the above-described film 10, the leading end portion of the film 10 is turned around the shaft 76 by the guide 78 and by winding characteristics of the film 10 so that the film 10 is successively accommodated within the accommodating portion 80 demarcated by the guide 78.

When a reading operation of the information recorded on the tracks S1, S2 is completed, a decision of step 144 is yes. In step 146, the pulse motor 66 is reversely rotated, and at the same time, the spool 22 is rotated by the cartridge driving actuator 60 in a winding direction, so that the film 10 pulled out is entirely contained in the cartridge 18. Next, in step 148, the opening of the cartridge 18 is closed. In step 150, the shading cover 52 slides so that the opening 36B is opened. In step 152, the cartridge 18 is discharged outside of the casing 36A by the cartridge discharging portion 58. Further, in step 154, the shading cover 52 slides so that the opening 36B is closed. In this manner, the film-data reading operation is completed and the process returns to step 102 of the flow chart in FIG. 6.

Further, in a case in which extra prints are ordered from the customer, when the print order slip 46 is loaded into the loading portion 48 and the information recorded on the print order slip 46 is read and output by the mark-sheet reader 50, a decision of step 108 is yes. As a result, in the above-described manner, in step 114, the input data is stored in the memory, and the contents of the input data is displayed on the display 40.

When all data necessary for issuing order forms has been completed in the above-described manner, a decision of step 112 is yes and the process proceeds to step 120. In step 120, the data input in the above-described manner is edited to issue each order form. For example, data input when extra prints are ordered so as to specify image frames for extra prints is not necessary information for an order form to be handed to the customer. For this reason, such data is removed from the editing information for issuing the order form handed to the customer. Meanwhile, an expected date of delivery of photographic processing is automatically calculated from an order-accepted date in accordance with the type of ordered photographic processing. Further, a receipt number for identifying each order is automatically given to each of photographic processing orders.

The next step 122 instructs the printer 44 to issue three sheets of order form for the customer, the laboratory, the photo processing shop, which are shown as an example in FIG. 8A through FIG. 8C, on the basis of the above-described edited data. The next step 124 clears the data stored in the memory and the process returns to step 102.

In this way, when an accepting operation for a single order for photographic processing is completed, the order form for the customer is handed to the customer, and the order form for the laboratory is used as an order card and sent to the laboratory together with the cartridge 18 received from the customer. Then, an order is registered by, for example, inputting the contents described on the order card by a keyboard operation. It should be noted that a magnetic or optical recording area may be provided on this order card so that the order contents can be registered only by inserting the order card into a card reader.

Next, the order form for the photo processing shop is kept in the photo processing shop. Meanwhile, the order form for the customer is one which shows that the ordered photographic processing has been accepted (which corresponds to a first order form of the present invention). As shown in FIG. 8A, for example, information of an order-receiving date, receipt number, customers's name and telephone number, the contents of the ordered photographic processing, the date by which the prints are expected to be finished, and the like, is recorded on the order form for the customer.

Further, the order form for the laboratory is one for informing the laboratory of the contents of the ordered photographic processing (which corresponds to a second order form of the present invention). As shown in FIG. 8C, for example, further detailed contents of the ordered photographic processing in addition to the above-described information (for example, film manufacturer, and when an order for extra prints is placed, frame number of an image frame, number of sheets for extra prints, and the like, which are referred to FIG. 10) are also recorded on the order form for the laboratory. Further, the order form for the photographic processing shop is one for checking whether the ordered photographic processing has been finished according to the customer's order and is issued as a copy of the order form which is kept in the photo processing shop.

As shown in FIG. 8A through FIG. 8C, the expected date of delivery of prints of the ordered photographic processing is recorded on each order form (it is described as "the date by which the prints are expected to be finished" in FIG. 8A and FIG. 8B, and is described as "the expected date of delivery" in FIG. 8C). As a result, the customer, the photo processing shop and the laboratory can easily confirm the excepted date individually by referring to the respective slips. For this reason, it is possible to prevent occurrence of drawbacks in that the prints of the ordered photographic processing are not finished by the expected date of delivery because the expected date of delivery was not correctly communicated to the laboratory, and the customer would go to the shop of accepting an order for photographic processing many times to receive the prints of the completed photographic processing because, for example, the customer forgets the date by which the prints of the ordered photographic processing are expected to be finished.

Further, each order form is shown in which "simultaneous prints", is described as an example for the kind of the ordered photographic processing. In each order form, a print size is described in an item indicated as "printing paper". As a result, since a finished print size can easily be confirmed by referring to the order form, particularly, in the laboratory, it is possible to prevent occurrence of errors in that prints of incorrect print size are finished because the ordered finished print size was not correctly communicated to the laboratory.

Thus, in this embodiment, it is not necessary to write down all necessary information from the customer to issue the order form. This makes it easy to accept an order for photographic processing so that the order for photographic processing can be efficiently accepted from the customer, and further, it is possible to prevent mistakes due to mishearing or miswriting. Further, in this embodiment, the information relating to the photographic processing is kept in such a way that the customer, the laboratory and the photo processing shop conventionally keep the respective order forms. Accordingly, it is not necessary to change a conventional flow of the process from the time of accepting an order for photographic processing to the time of handing the finished prints of photographic processing to the customer. In addition, the present invention can be carried out only by installing the apparatus for accepting an order for photographic processing 30 according to the present invention in the photo processing shop.

Meanwhile, in the above-described embodiment, "simultaneous prints" is selected as the order contents. However, the present invention is not limited to the selection of "simultaneous prints", and all orders for photographic processing, e.g., orders for making index prints, orders for lettering in a printing paper or the like, orders for making extra prints and trimming at the time of making extra prints, can be indicated by the order form (i.e., the order card).

Next, another example of a process to be effected in the controller 42 will be described by referring to FIG. 9. It should be noted that the same steps as those of FIG. 6 will be denoted by the same reference numerals, and only portions different from those of FIG. 6 will be described.

Figure 4:
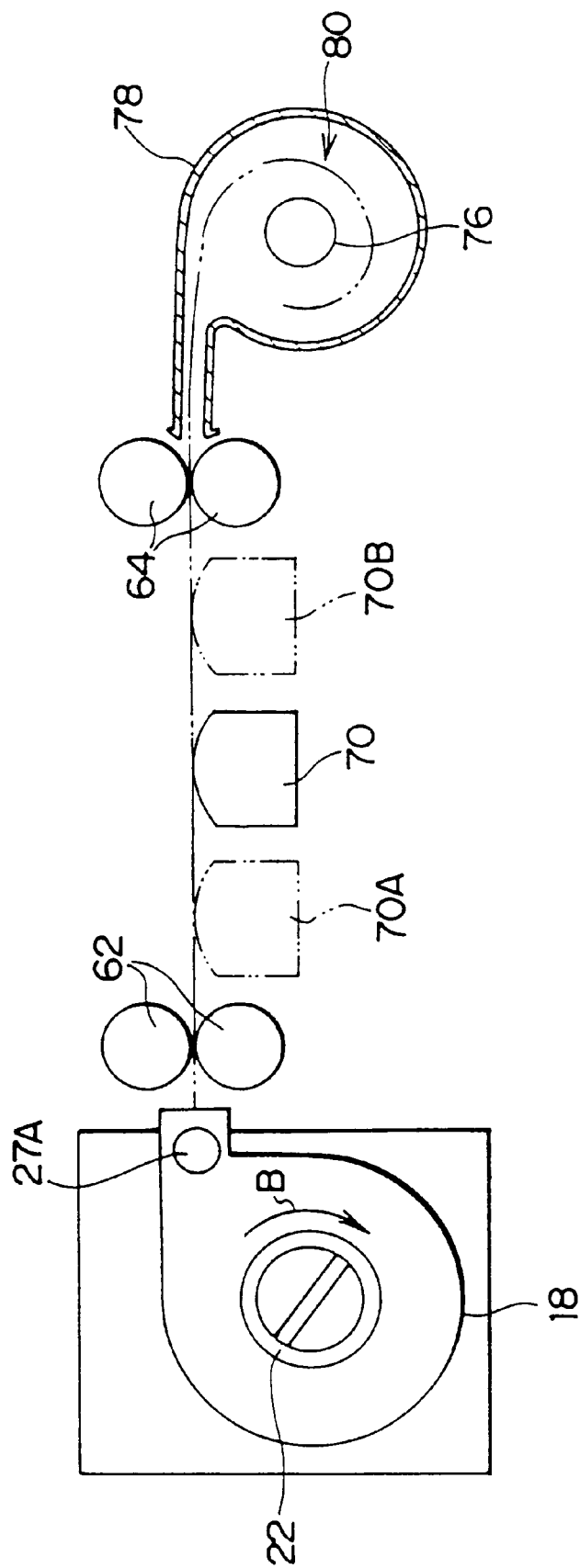
FIG. 4 is a schematic structural view of an interior of a film-data reading device.

In the modified example, as shown in FIG. 4, an erasing head 70A and a recording head 70B as well as the reading head 70 corresponding to the track of the film 10 are provided between the pair of conveying rollers 62 and the pair of conveying rollers 64. The recording head 70B is adapted to record the order contents on the track of the film 10 in accordance with a signal from the controller 42. In this case, unnecessary information may be erased by the erasing head 70A from the information previously recorded on the track, and additional information may be written thereon, or may be recorded on a non-recorded area.

In the process shown in FIG. 9, when it is determined that all data has been completed in step 112, in step 113, the order contents are recorded on the track of the film 10 by the recording head 70B. The process proceeds to step 120, in which data for issuing order forms is edited. After that, the process proceeds to step 122.

In step 122, only the order forms for the customer and the photo processing shop are issued. The next step 160 determines whether or not the indication for issuing the order form for the laboratory has been input by the operator. When a decision of step 160 is no, in step 162, data edited for issuing the order form for the laboratory is accumulated in the memory and other data is cleared. Then, the process proceeds to step 102. Accordingly, the slip for the laboratory is not issued until the indication for issuing the order form for the laboratory is made, and data is only accumulated.

When the indication for issuing the order form for the laboratory is made by the operator, the decision of step 160 is yes. In step 164, data of the order form for the laboratory which is previously accumulated in the memory, and edited data of the slip for the laboratory are synthesized, so that the order form for the laboratory as shown in FIG. 10 is issued. This order form is used as a copy of the order form in the laboratory and is suitable for collation with respect to the information recorded on the track of the film 10.

In the next step 166, the data stored in the memory is entirely cleared and the process returns to step 102.

Meanwhile, in FIG. 9, the order form for the laboratory is to be issued only when the indication for issuing the order form for the laboratory is made. However, the present invention is not limited to the same, and the order form may be automatically issued each time the data corresponding to a predetermined number of orders for photographic processing is accumulated. Namely, since the order contents can be determined by the laboratory from the contents recorded on the track of the film 10, any time lag in generating the form is not a problem.

Further, in the foregoing, the case in which the bar code reader 32 serving as a container reading means for reading the data recorded on the container, and the film-data reading device 36 serving as a film reading means for reading the data recorded on the film are used as the first reading means was described as an example. However, the present invention is not limited to the same, and only either one of the container reading means and the film reading means may be provided. Further, the container reading means may be replaced with a conductive pattern reading means for reading an electrically conductive pattern, which is provided at a predetermined position of an existing cartridge so as to represent a type of film or the like.

Moreover, the means which records the information on the container for containing the film is not limited to the bar code, and a magnetic information reading means may be used as the first reading means, in which the magnetic recording portion may be provided by previously applying magnetic material to the container, or by attaching a magnetic tape thereto, and information may be magnetically recorded on the magnetic recording portion. When the information is to be magnetically recorded on the film or the container, in comparison with the above-described conductive pattern, the customer can easily add and record arbitrary information and the recorded information can be rewritten. Further, recording of the information on the film is not limited to magnetic recording of the information on a magnetic recording layer previously provided on the film, and the information may be optically recorded by, for example, an ink, in a form of a bar code or the like.

Further, in the foregoing, the card 35 to which a magnetic tape is attached was described as an example of the recording medium according to the present invention. However, a memory card or the like may also be used. Further, it suffices that the customer identification information can merely identify individual customers. Accordingly, the customer identification information is not limited to their name or telephone number. For example, an existing credit card or a cash card as used when employing a cash dispenser may be used as the recording medium according to the present invention, to read symbols, numbers or the like, printed on such cards, as the identification information. Further, in the foregoing, the third reading means is formed by the mark-sheet reader 50 which serves as a mark reading means for reading marks recorded on the print order slip in the "mark-sheet" system. However, the present invention is not limited to the same, and a character reading means such as an OCR which reads characters such as figures entered on the print order slip by a customer's handwriting may be used as the third reading means.

Further, in the foregoing, the case in which the order for development, "simultaneous prints", or making extra prints is placed from the customer, was described as an example. However, the photographic processing according to the present embodiment is not limited to the same. For example, enlargement, printing to a post card or the like, making a slide film, and the like are, of course, included in the present invention.

As described above, the above-described first embodiment of the present invention is constructed in that the first reading means reads the information relating to the above-described photographic processing, which is previously recorded on a film received from the customer which places an order for photographic processing, or on a container which contains the film, and at the same time, the second reading means reads the customer identification information previously recorded on the recording medium carried by the customer, and further, an issuing means issues the first order form to be handed to the customer, which represents that at least ordered photographic processing has been accepted, and the second order form for communicating the contents of the above-described ordered photographic processing to the laboratory, by using the above-described read information. Accordingly, this embodiment allows the order for photographic processing from the customer to be accepted efficiently and correctly.

Next, a description will be given of a second embodiment of the present invention. FIG. 11 shows a film 10 according to the second embodiment. As the film 10, a film similar to that described in, for example, Japanese Patent Application Laid-Open No. 4-273238, can be used. Meanwhile, the film 10 of the second embodiment includes a negative film and a positive film, and also includes a color film and a black-and-white film.

In the film 10, an emulsion is applied to one surface of an elongated base thereof so that an emulsion layer is formed thereon. An image frame 10A is exposed and recorded on the emulsion layer by an unillustrated camera. A perforation 12 corresponding to the image frame 10A is disposed along a longitudinal direction of the film 10 at a lateral-directional end portion of the film 10. The perforation 12 is provided so as to correspond to each image frame 10A.

A transparent magnetic material equivalent to that described in U.S. Pat. No. 4,974,096 or the like is applied to the surface of the film 10 which is opposite to the surface on which the emulsion layer is formed, and a magnetic recording layer is formed on the opposite surface of the film 10. Formed at a portion of the magnetic recording layer, on which image frames 10A are not recorded, are tracks S1, S2.

Recorded on the tracks S1, S2 are different film information such as the type of film, DX code, film manufacturer, date of manufacture, or the like, for each film, different photographing information recorded by a camera equipped with a function of magnetically recording information such as a photographing date, the type of light source, an aspect ratio of an image, photographing magnitude, a top side of an image, and the like, for each image frame 10A, and an exposure condition (i.e., exposure correction amount) at the time of "simultaneous printing".

Figure 12:
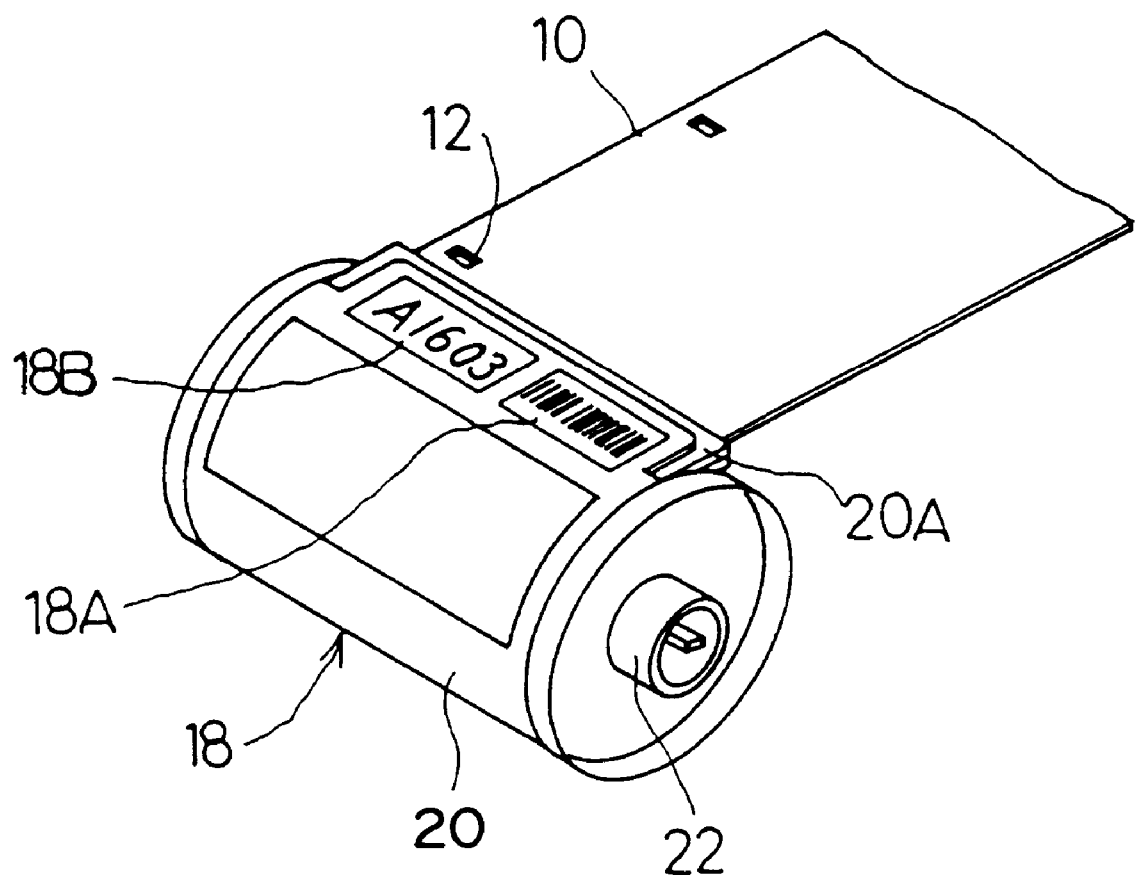
FIG. 12 is a perspective view of a cartridge.

As shown in FIG. 12, a film case 18 as a container of the present invention (which is referred to hereinafter as a cartridge 18 in order to tell it from a general film case) is formed by a substantially cylindrical cartridge main body 20 and a spool 22 rotatably supported within the cartridge main body 20. An opening is formed at an end portion of a protruding portion 20A which protrudes from the cylindrical portion of the cartridge main body 20 in a tangential direction thereof, so that the film 10 can pass through.

A fastening portion (not shown) is provided on the spool 22 and a rear end portion of the film 10 is fastened to the fastening portion so as to be removable. A shutter (not shown) is provided in the opening of the protruding portion 20A. The shutter opens when the film 10 is wound up and pulled out, and closes when the film 10 is accommodated in the cartridge 18.

Further, in the cartridge 18, a bar code 18A and a numeral 18B, which represent the above-described film information and cartridge identification information for identifying the individual cartridges 18 are recorded on an outer periphery of the cartridge main body 20.

Figure 13:
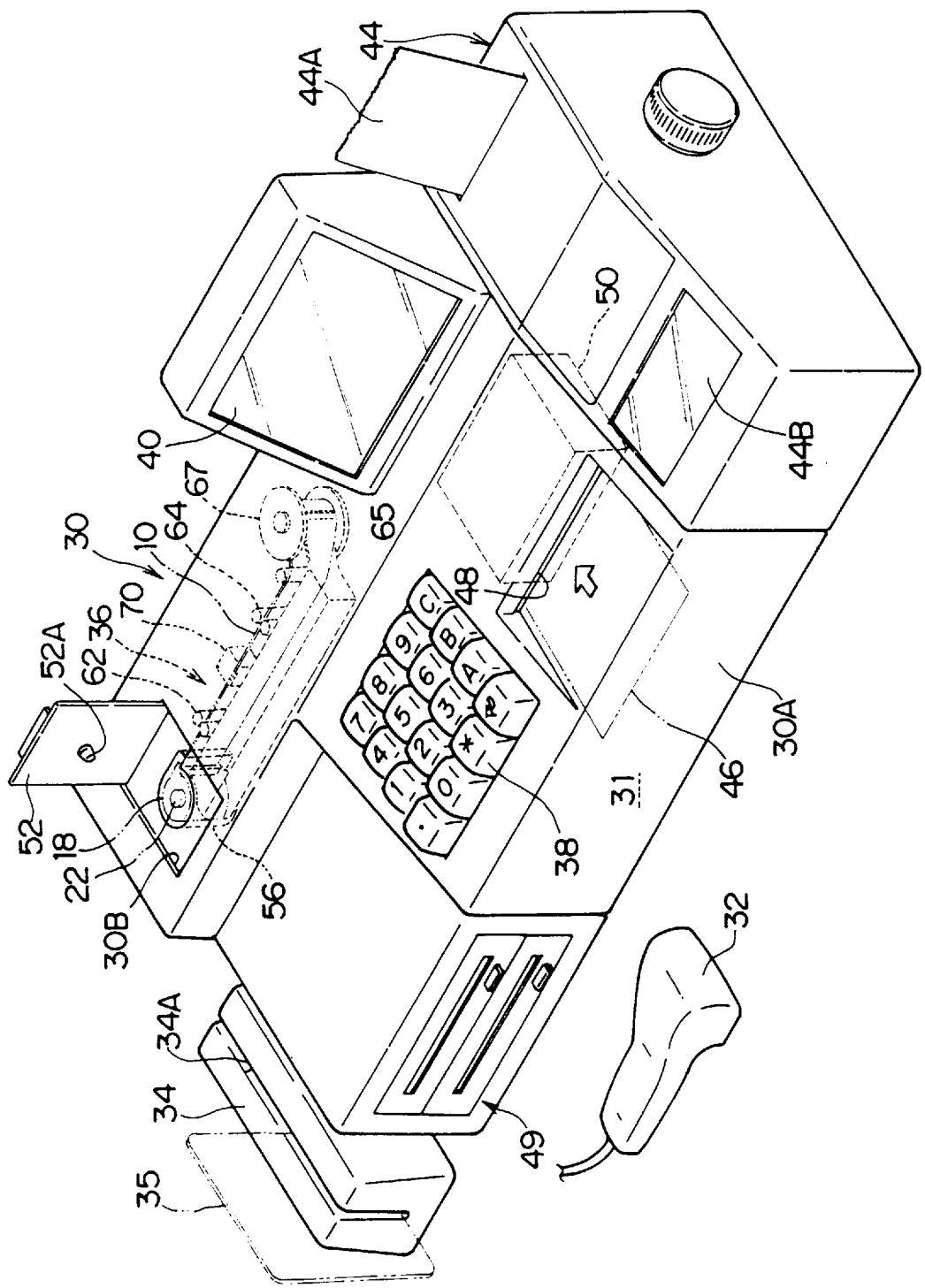
FIG. 13 is a perspective view illustrating an exterior of an apparatus for accepting an order for photographic processing according to the second embodiment.

Next, a description will be given of an apparatus for accepting an order for photographic processing 30 according to the present invention, which is to be installed in a photo processing shop or the like. As shown in FIG. 13, the apparatus for accepting an order for photographic processing 30 is formed by a main body accommodated in a casing 30A, a bar code reader 32 and a card reader 34 separated from the casing 30A.

Figure 14:
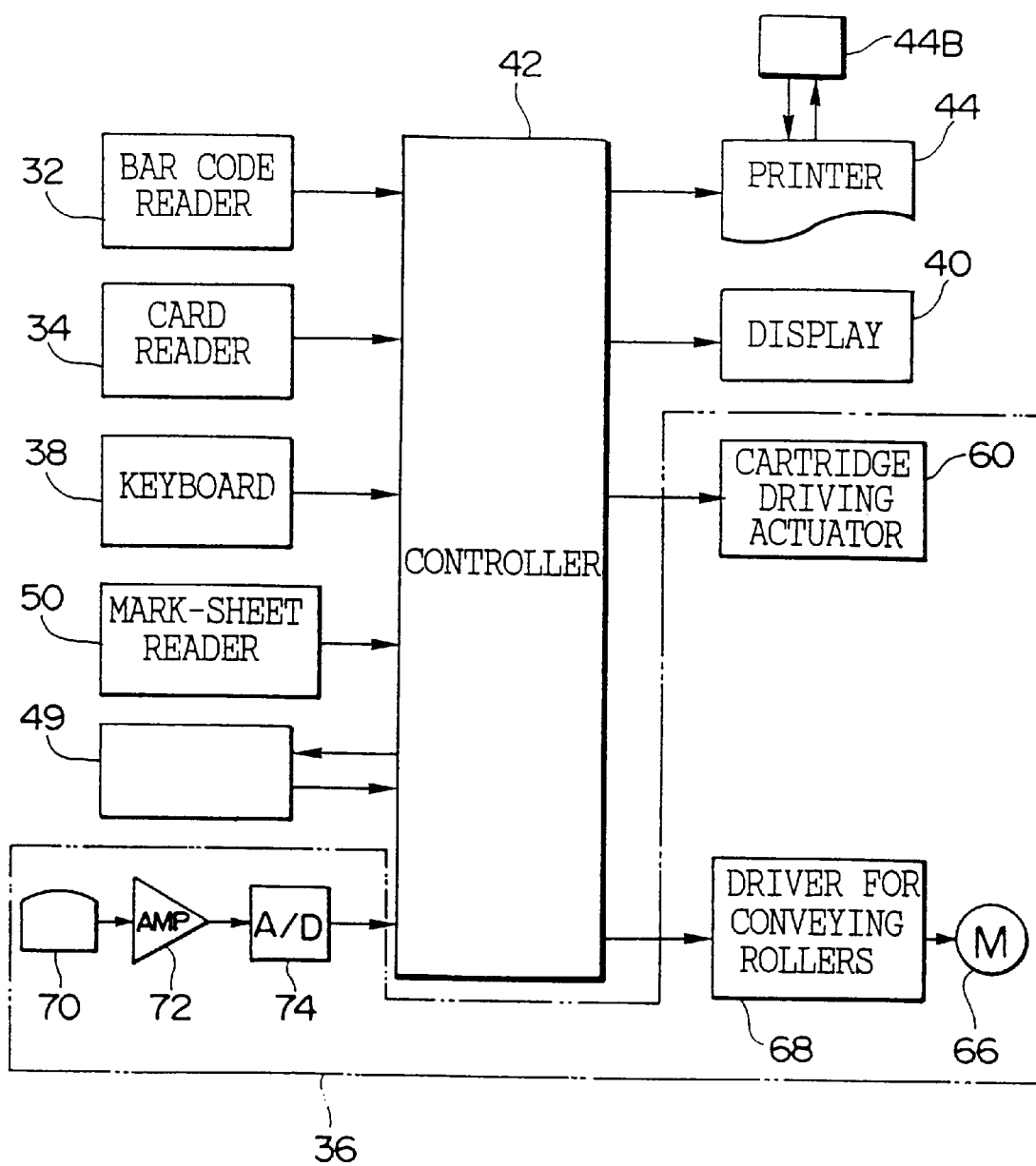
FIG. 14 is a block diagram illustrating a schematic structure of the apparatus for accepting an order for photographic processing.

The bar code reader 32 can read a bar code when an operator which accepts an order for photographic processing, operates it so as to cause a reading portion provided at a leading end portion of the bar code reader 32 to correspond to a bar code printed on the cartridge 18. The bar code reader 32 is connected to a controller 42 (see FIG. 14), and outputs data which the read bar code represents, to the controller 42.

On the other hand, a customer which places an order for photographic processing with a photo processing shop, brings in a card 35, in which identification information (i.e., customer's name and telephone number) for identifying each customer is magnetically recorded on a magnetic tape previously attached to the card 35. The information recorded on the card 35 is read by the card reader 34.

A slit-shaped groove portion 34A is provided in the card reader 34 such that the card 35 is inserted in the groove portion 34A. When the inserted card 35 is moved by an operator, the identification information magnetically recorded on the card 35 can be read. The card reader 34 is connected to the controller 42 and outputs the read identification information to the controller 42.

Next, a description will be given of the main body 31.

An upper surface of the casing 30A is partly inclined, and a keyboard 38 is provided at this inclined portion. The keyboard 38 is connected to the controller 42 (see FIG. 14) which is provided within the casing 30A and which is formed by a micro computer or the like. The keyboard 38 permits input of various data and indications by an operator, to the controller 42.

A display 40 is provided on a plane surface of the main body 31 at a rear side of the inclined portion at which the keyboard 38 is provided. The display 40 displays various data in accordance with indications from the controller 42.

Further, a printer 44 is mounted to a right side surface of the main body 31. The printer 44 is connected to the controller 42 and prints various information on a recording paper 44A in the form of a roll in accordance with the indications from the controller 42. The printer 44 is provided with a touch panel 44B having input/display functions, which can input indications such as a format for a printing operation and display the contents of the indications.

An inserting opening 48 for inserting a print order slip 46 is provided on a casing surface at a right side of the keyboard 38. The print order slip 46 is used to inform the photo processing shop of image frames for ordered extra prints when the customer places an order for extra prints, and the information which specifies image frames for extra prints ordered by the customer, is recorded by the customer as marks in a so-called "mark-sheet" system (in which dots or blank spaces are marked). A mark-sheet reader 50 is provided inside of the inserting portion 48. The mark-sheet reader 50 can read the marks recorded on the print order slip 46 when the operator inserts the print order slip 46 in the inserting portion 48. The mark-sheet reader 50 is connected to the controller 42 and outputs the information which the read marks represent, to the controller 42.

Further, a floppy-disk loading portion 49 is disposed at a left side of the keyboard 38, and can read information recorded on a floppy disk in place of the above-described print order slip 46 and output the information to the controller 42. In addition, the read information can also be recorded and saved on the floppy disk.

A film-data reading device 36 is provided at a left side of the display 40 in FIG. 13. The film-data reading device 36 has an opening 30B formed on an upper surface of the casing 30A and a shading cover 52 provided so as to correspond to the opening 30B. The shading cover 52 can rotate to a position in which the shading cover 52 closes the opening 30B, or a position in which the shading cover 52 opens the opening 30B. Meanwhile, the shading cover 52 is provided with a projection 52A which supports the spool 22 of the cartridge 18. The projection 52A is supported by one end of the spool 22 when the shading cover 52 closes.

A cartridge loading portion 56 is provided inside of the casing 30A at a position which corresponds to the opening 30B. The cartridge 18 put into the casing 30A via the opening 30B in an open state, is transferred to the cartridge loading portion 56 and is set in a read position.

Further, a cartridge driving actuator 60 (see FIG. 14) is disposed inside of the film-data reading device 36 in the vicinity of the read position. The cartridge driving actuator 60 is connected to the controller 42, and rotates the spool 22 of the cartridge 18 in accordance with the indications from the controller 42. Further, the shutter is opened or closed via an exposed portion of the cartridge 18 in accordance with the indications from the controller 42. A pair of conveying rollers 62 is disposed at a position which corresponds to an opening of the cartridge 18 disposed at the read position. A pair of conveying rollers 64 is disposed at a downstream side of the pair of conveying rollers 62 apart therefrom at a predetermined distance. Each pair of conveying rollers 62, 64 rotates by a driving force of a pulse motor 66 (see FIG. 14) being transmitted thereto and conveys the film 10. The pulse motor 66 is connected to the controller 42 via a driver 68 for conveying rollers and rotates each pair of conveying rollers 62, 64 in accordance with the indications from the controller 42. As a result, the film 10 is pulled out of the cartridge 18, and guided by a guide plate 65 via each pair of conveying rollers 62, 64, and finally wound around a reel 67. The reel 67 serves to temporarily accommodate the film 10 pulled out of the cartridge 18.

A reading head (magnetic head) 70 is disposed between the pair of conveying rollers 62 and the pair of the conveying rollers 64 so as to correspond to the track of the film 10. The reading head 70 is connected to the controller 42 via an amplifier 72 and an A/D converter 74 (see FIG. 14). The information recorded on the track is read by the reading head 70 when the film 10 is conveyed, and is converted to digital data. Then, the digital data is output to the controller 42.

Figure 15:
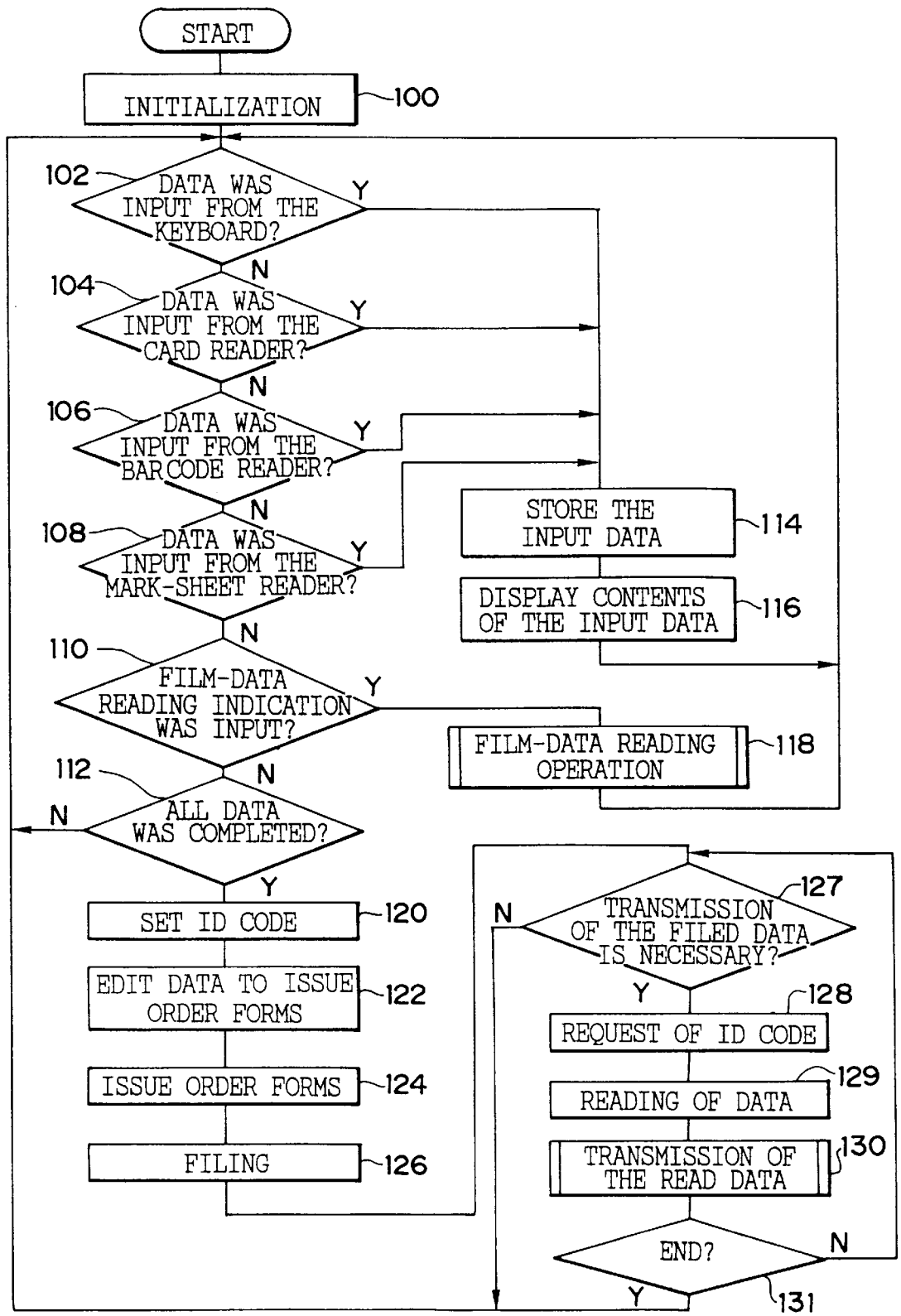
FIG. 15 is a flow chart for illustrating, as an operation of the second embodiment, an operation effected in the apparatus for accepting an order for photographic processing.
Figure 16:
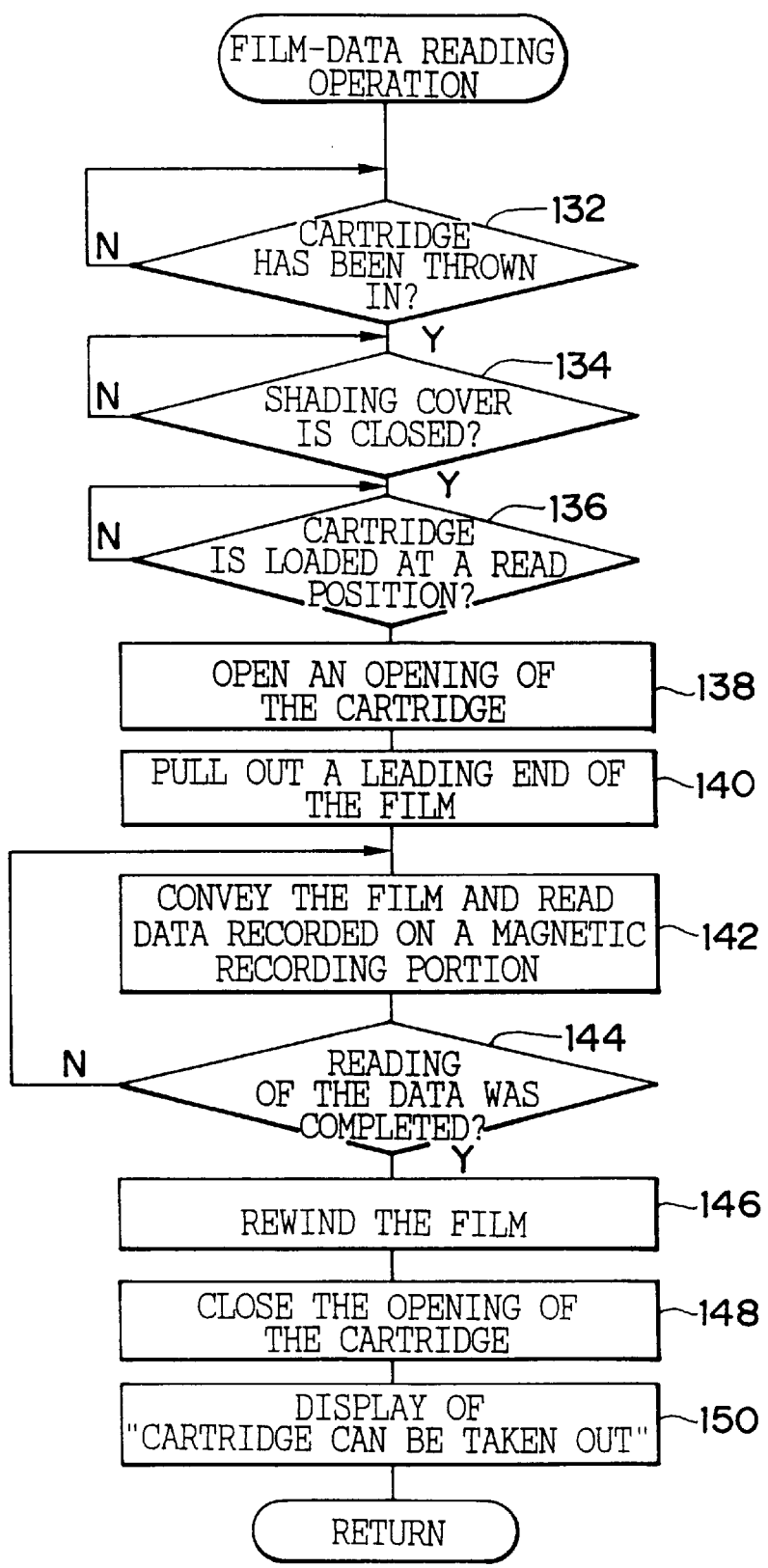
FIG. 16 is a flow chart for illustrating a film-data reading operation effected in the apparatus for accepting an order for photographic processing.

Next, an operation of the second embodiment will be described by referring to FIG. 15 and FIG. 16. First, by referring to FIG. 15, a description will be given of a main process which is to be performed in the apparatus for accepting an order for photographic processing 30. Meanwhile, the process shown in FIG. 15 is performed in the controller 42 when the apparatus for accepting an order for photographic processing 30 is turned on.

In step 100, in order to effect initialization, the bar code reader 32 and the card reader 34 are actuated, and at the same time, an unillustrated memory of the controller 42 is cleared. In addition, the current-date is fetched from a timer built in the controller 42. Step 102 determines whether or not data has been input from the keyboard 38. When a decision of step 102 is no, step 104 determines whether or not data has been input from the card reader 34. When a decision of step 104 is no, step 106 determines whether or not data has been input from the bar code reader 32.

When a decision of step 106 is also no, step 108 determines whether or not data has been input from the mark-sheet reader 50. When a decision of step 108 is also no, step 110 determines whether or not the film-data reading indications has been input by an operator operating the keyboard 38. When a decision of step 110 is also no, step 112 determines whether or not all necessary data for issuing order forms described below has been completed. When a decision of step 112 is also no, the process returns to step 102. Then, steps 102 through 112 are repeated until any one of steps 102 through 112 obtains a decision of yes.

On the other hand, when the customer orders for photographic processing, the customer brings the cartridge 18 in which the film 10 to be processed is contained, and the card 35 (and when the customer orders for extra prints, the customer also brings the print order slip 46) to the photo processing shop, and tells the operator the type of photographic processing for which the customer orders (e.g., development, "simultaneous prints", extra prints, and the like), and at the same time, hands the cartridge 18, the card 35, or the like to the operator. Thus, the operator first operates the keyboard 38 and inputs the type of ordered photographic processing. Next, the operator sets the card 35 in the card reader 34 so that information recorded in the card 35 is read by the card reader 34, and thereafter, returns the card 35 to the customer. Then, the operator causes the bar code reader 32 to read a bar code recorded in the cartridge 18 and instructs the reading of the information magnetically recorded on the track of the film 10. Further, when accepting an order for extra prints, the operator inserts the print order slip 46 in the inserting portion 48 and causes the mark-sheet reader 50 to read the information recorded on the print order slip 46.

As described above, in the apparatus for accepting an order for photographic processing 30, when the decision of step 102 is yes, in step 114, input data (in this case, the type of ordered photographic processing) is stored in the memory. In step 116, the contents of the input data is displayed on the display 40 and the process returns to step 102. As a result, the operator can confirm the contents of the input data by the display 40. Meanwhile, the contents of all data to be decided in the above-described step 112 change in accordance with the above-described input type of photographic processing. For example, when "simultaneous prints" is ordered, the above-described step 112 does not obtain the decision of yes unless data such as a print size is input. Further, for example, when extra prints are ordered, the above-described step 112 does not obtain the decision of yes unless data which specifies image frames for extra prints is input.

Next, when data read from the card 35 is input from the card reader 34, a decision of step 104 is yes, and in step 114, the input data is stored in the memory, and at the same time, in step 116, the contents of the input data is displayed on the display 40. Next, when the bar code data recorded in the cartridge 18 is input from the bar code reader 32, the decision of step 106 is yes, and in the above-described manner, the input data is stored in the memory (step 114), and the contents of the input data is displayed (step 116). Meanwhile, when the data input to the controller 42 is abnormal due to an operational failure of the keyboard 38, a read error of the bar code reader 32 or the card reader 34, or the like, the abnormal input data is detected by the operator confirming the contents displayed on the display 40. Then, various information is repeatedly input until the operator determines that the input data is normal, and data stored in the memory is updated each time information is input.

Further, in a case in which the photographic processing ordered from the customer is extra prints, when the print order slip 46 is inserted in the inserting portion 48, and the information recorded on the print order slip 46 is read and output by the mark-sheet reader 50, a decision of step 108 is yes. As a result, as in the above-described manner, the input data is stored in the memory in step 114, and the contents of the input data is displayed on the display 40.

Next, when the film-data reading indications are input by the operator, a decision of step 110 is yes, and in step 118, a film-data reading operation is effected. The film-data reading operation will be described by referring to the flow chart shown in FIG. 16. First, the shading cover 52 is rotated so as to open the opening 30B, and the cartridge 18 is put into the opening 30B. After that, the shading cover 52 is once more closed. Step 132 determines whether or not the cartridge 18 has been put in. When a decision of step 132 is yes, step 134 determines whether or not the shading cover 52 has been closed. When a decision of step 134 is yes, step 136 determines whether or not the cartridge 18 has been mounted to a predetermined position. When a decision of step 136 is yes, in step 138, an opening of the cartridge 18 is opened by the cartridge driving actuator 60. In the next step 140, the spool 22 is rotated by the cartridge driving actuator 60 and the leading end portion of the film 10 is pulled out of the cartridge 18, and further, the film is held by each pair of conveying rollers 62, 64.

In step 142, the pulse motor 66 is driven via the driver 68 for conveying rollers so that the film 10 is conveyed by the pairs of conveying rollers 62, 64 in a direction in which the film 10 is pulled out, and at the same time, the information recorded on the tracks S1, S2 of the film 10 is read by the reading head 70. Step 144 determines whether or not a reading operation of the tracks S1, S2 has been completed. The process of step 142 is repeated until a decision of step 144 obtains the decision of yes. Meanwhile, when the above-described film 10 is being conveyed, the leading end portion of the film 10 is wound around the reel 67 by the guide plate 65, and is temporarily accommodated by the reel 67.

When the reading operation of the information recorded on the tracks S1, S2 is completed, a decision of step 144 is yes. In step 146, the pulse motor 66 is reversely rotated, and at the same time, the spool 22 is rotated by the cartridge driving actuator 60 in a winding direction, so that the film 10 is entirely contained in the cartridge 18. Next, in step 148, the opening of the cartridge 18 is closed.

The next step 150 indicates that "cartridge can be taken out" on the display 40, and the process proceeds to step 102 of the flow chart in FIG. 15.

When all data necessary for issuing order forms has been completed in the above-described manner, a decision of step 112 is yes and the process proceeds to step 120. Step 120 sets an ID (code) of the data input in the above-described manner, and step 122 edits the data to issue order forms. For example, data input when extra prints are ordered so as to specify image frames for extra prints is not necessary information for an order form to be handed to the customer. For this reason, such data is removed from the editing information for issuing the order form handed to the customer. Meanwhile, an expected date of delivery of photographic processing is automatically calculated from an order-accepted date in accordance with the type of ordered photographic processing. Further, a receipt number for identifying each order is automatically given to each of photographic processing orders.

The next step 124 indicates the printer 44 to issue three sheets of order form for the customer, the laboratory, the photo processing shop, which are shown as an example in FIG. 17A through FIG. 17C, on the basis of the above-described edited data. In the next step 126, all data is filed in the floppy disk using the ID as a keyword.

The next step 127 determines whether or not it is necessary to transmit the filed data to the laboratory. When a decision of step 127 is no, the process proceeds to step 102. Further, when the decision of step 127 is yes, in step 128, a request of inputting the ID (code) is made, and in step 129, data on a basis of the ID (code) is read. At this time, the read data is displayed on the display 40, of course.

The next step 130 starts to transmit the read data. When the step 131 determines that the operation of transmitting the read data ended, the process returns to step 102.

In this way, when an accepting operation for a single order for photographic processing is completed, the order form for the customer is handed to the customer, the order form for the laboratory is sent to the laboratory together with the cartridge 18 received from the customer (or only data may be in advance transmitted to the laboratory), and the order form for the photo processing shop is kept in the photo processing shop. Meanwhile, the order form for the customer shows that the ordered photographic processing has been accepted. As shown in FIG. 17A, for example, information of an order-receiving date, receipt number, customers's name and telephone number, the contents of the ordered photographic processing, the date by which the prints are expected to be finished, and the like, is recorded on the order form for the customer.

Further, the order form for the laboratory informs the laboratory of the contents of the ordered photographic processing. As shown in FIG. 17C, for example, further detailed contents of the ordered photographic processing in addition to the above-described information (for example, film manufacturer, and when an order for extra prints is placed, frame number of an image frame, number of sheets for extra prints, and the like) are also recorded on the order form for the laboratory. Further, the order form for the photographic processing shop is for checking whether the ordered photographic processing has been finished according to the customer's order and is to be issued as a copy of the order form which is kept in the photo processing shop.

Thus, in this embodiment, it is not necessary to ask the customer all necessary information and write it down to issue the order form. This makes it easy to accept an order for photographic processing so that the order for photographic processing can be efficiently accepted from the customer, and further, it is possible to prevent errors due to mishearing or miswriting. Further, in this embodiment, the information relating to the photographic processing is kept in such a way that the customer, the laboratory and the photo processing shop conventionally keep the respective order forms. Accordingly, it is not necessary to change a conventional flow of the process from the time of accepting an order for photographic processing to the time of handing the finished prints of photographic processing to the customer. In addition, the present invention can be carried out only by installing the apparatus for accepting an order for photographic processing 30 according to the present invention in the photo processing shop.

Further, in the foregoing, the case in which the bar code reader 32 serving as the means for reading the data recorded on the container, and the film-data reading device 36 serving as a film reading means for reading the data recorded on the film are used was described as an example. However, the present invention is not limited to the same, and either one of the above-described means may be provided. Further, a conductive pattern reading means for reading a conductive pattern which is formed at a predetermined position of a conventional cartridge so as to represent a type of film or the like, may be provided instead of the means for reading the data recorded on the container.

Moreover, the means which records the information on the container for containing the film is not limited to the bar code, and the magnetic recording portion may be provided by previously applying magnetic material to the container, or by attaching a magnetic tape thereto, and information may be magnetically recorded on the magnetic recording portion. When the information is to be magnetically recorded on the film or the container, in comparison with the above-described conductive pattern, the customer can easily add and record arbitrary information and rewrite the recorded information. Further, recording of the information on the film is not limited to magnetic recording of the information on a magnetic recording layer previously provided on the film, and the information may be optically recorded by, for example, an ink, in a form of a bar code or the like.

Further, in the foregoing, the card 35 to which a magnetic tape is attached was described as an example of the recording medium according to the present invention. However, a memory card or the like may also be used. Further, it suffices that the customer identification information can merely identify individual customers. Accordingly, the customer identification information is not limited to their name or telephone number. For example, an existing credit card or a cash card as used when employing a cash dispenser may be used as the recording medium according to the present invention, to read symbols, numbers or the like, printed on such cards, as the identification information.

Further, in the foregoing, the case in which the order for development, "simultaneous prints", or making extra prints is placed from the customer, was described as an example. However, the photographic processing according to the present embodiment is not limited to the same. For example, enlargement, printing to a post card or the like, making a slide film, and the like are, of course, included in the present invention.

FIG. 18 shows an order card 46A (first card) for extra prints.

The card 46A is the free order style that is independent of the number of image frames. Namely, the card 46A is made into a tabular form by ruled lines. A top line of the table defines each title of the lines below the top line. In this top line, a "size" indicating section 82A, a "frame number" indicating section 82B and "number of order prints" indicating section 82C are sequentially arranged from a left side of the paper of FIG. 18. Further, the "order card for extra prints" is indicated at a top portion of the order card 46A outside of the table. Provided below the indication of the "order card for extra prints" are an area 84 for entering the number of each photographic processing envelop (not shown), an area 86 for entering the ID number of each film cartridge, and an area 88 for entering the total number of frames.

In the "size" indicating section 82A of the table, characters of "L", "H" and "P", which are respectively put in angle brackets at the upper and lower portions of the characters, are printed on each line. The character "L" means a size (the ratio of the length to the breadth is 3:4) which is to be printed at the time of so-called simultaneous prints, the character "H" means a high vision size (the ratio of the length to the breadth is 9:16), and the character "P" means a panorama size (the ratio of the length to the breadth is 3:8).

The customer can indicate any one size of "L", "H" and "P" by drawing a line from an upper bracket to a lower bracket of any character.

In the "frame number" indication section 82B, each number of figures from 1 to 10 and two-digit numbers (i.e., 20, 30 and 40), which are respectively put in angle brackets at the upper and lower portions of these numbers, are printed on each line. Each number corresponds to each frame number. When the frame number corresponds to any one of these printed numbers, it suffices that the customer draws a line from an upper bracket to a lower bracket of the corresponding number. When the frame number is 13, for example, the customer draws a line for each of the numbers of 10 and 3. In this way, the customer can specify the frame numbers up to the maximum number of 50.

In the "number of ordered prints" indicating section 82C, each number of figures from 1 to 10 and two-digit numbers (i.e., 20, 30, 40, 50, 60 and 70), which are respectively put in angle brackets at the upper and lower portions of these numbers, are printed on each line. Each number corresponds to the number of ordered prints. When the number of ordered prints corresponds to any one of these printed numbers, it suffices that the customer draws a line from an upper bracket to a lower bracket of the corresponding number. For example, when the order number of sheets is 24, the customer draws a line for both the numbers of 20 and 4. In this way, the customer can specify the number of ordered prints ranging the maximum number of 70.

Further, in a latter portion of the "number of ordered prints" indicating section 82C, "one each", "two each", and free space, which are respectively put in angle brackets, are shown on each line. For example, when the customer indicates a plurality of sizes, it is possible to order for extra prints of the same number of prints for each size. When the customer indicates the number of ordered prints of being larger than "two each", it suffices that the customer enters the desired number in the free space.

In the last portion of the "order number of sheets" indicating section 82C, "cancel" put in angle brackets are shown on each line. The customer can entirely cancel the indication of the line by putting drawings a line from an upper bracket to a lower bracket of the portion in which "cancel" is printed.

The card 46A shown in this embodiment has ten lines in which the order indications can be entered. When the customer needs to order for the number of image frames exceeding 10, the customer would place this order using two or more cards 46A.

Next, an operation of the first card 46A will be described.

When the customer orders extra prints at a later date, the customer receives the card 46A prepared in the photo processing shop. Then, in the photo processing shop or at home, the customer confirms the frame number of the negative image of which the customer wishes to order for extra prints, by referring to a negative film or a printing paper. When the frame number confirmed by the customer is No. 5, the customer draws a line at a portion, in which "5" in the "frame number" indicating section is printed, from an upper bracket to a lower bracket thereof. Next, the customer indicates the size of ordering extra prints in the "size" indicating section of the same line, and subsequently, indicates the number of ordered prints. In this case, when the customer indicates the number of ordered prints, whose number is not printed therein (for example, 13), the customer would specify the number of 13 by drawing a line at portions, in which numbers "3" and "10" are printed, from the upper brackets to the lower bracket, respectively.

By repeating the above-described operation for all of the image frames for which the customer desires extra prints, the order operation for extra prints would be completed. Meanwhile, when the customer cancels the ordered contents, the customer draws a line in a portion where "cancel" is printed, so as to cancel all the contents of the line on which "cancel" is printed.

Further, when the customer specifies two kinds of size, the customer can specify the same number of ordered prints for each size.

Next, the specified card 46A is brought in the photo processing shop together with a negative film, and is transferred from the photo processing shop to the laboratory. Further, the card 46A is inserted in a reading device installed in the laboratory as it stands. Since the reading device can automatically read the indicated contents entered in the card 46A and input the contents to a printing device or the like, it is possible to omit an operation of inputting the ordered contents by an operator.

Thus, even when the customer orders extra prints, it suffices that the customer draws a line in any printed portion. This makes it possible to easily effect an ordering process. Further, since an input operation which has conventionally depended on an operator, can be automated even in the laboratory, working efficiency improves and the possibility of mistaking the order is reduced. Further, with the automation, it is possible to reduce the cost for a re-order for extra prints, which also leads to a reduction in charge for the re-order.

In the above-described example, the first card 46A of the free order style was described. Next, an example in which a single negative film corresponds to a single order card, will be described.

Figure 19:
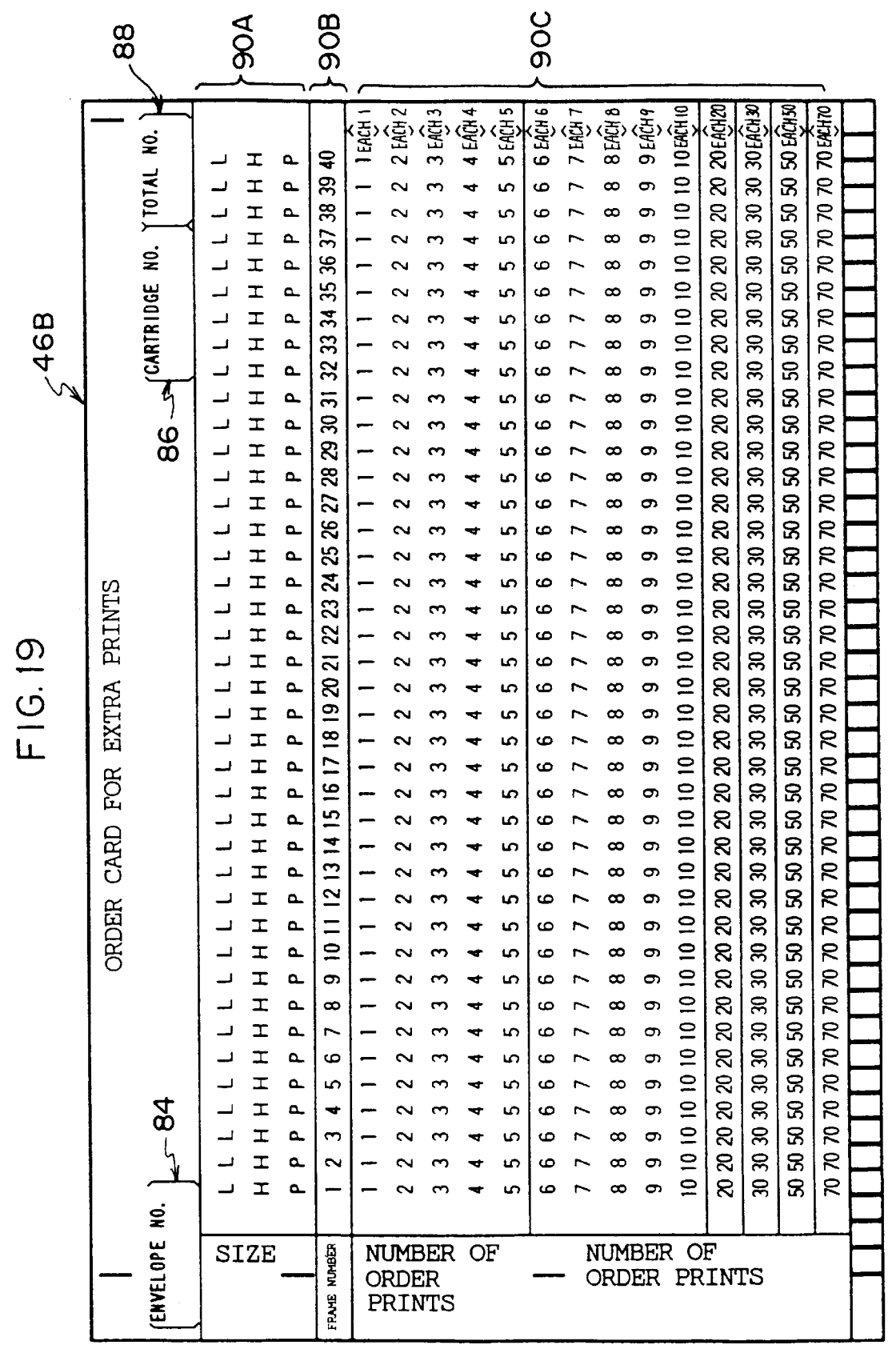

Namely, a second card 46B shown in FIG. 19 is a card of an all-order style which corresponds to one negative film and is enough to order for extra prints of all image frames in one negative film.

The second card 46B is made into a tabular form in the same manner as the above-described first card 46A. However, the second card 46B is made in a vertical form wherein respective titles such as a "size" indicating section 90A, "frame number" indicating section 90B and "number of ordered prints" indicating section 90C are sequentially arranged from an upper side of the table at a left side of the paper of FIG. 19.

Namely, the frame number is previously printed with sequential numbers from 1 to 40 and the customer would specify the size and the number of ordered prints in the row corresponding to the image frame for which the customer orders. In the second card 46B, the customer can specify the size and the number of ordered prints by encircling any printed number or any symbol.

Next, a description will be given of another form of an order card.

Figures 20A, 20B:
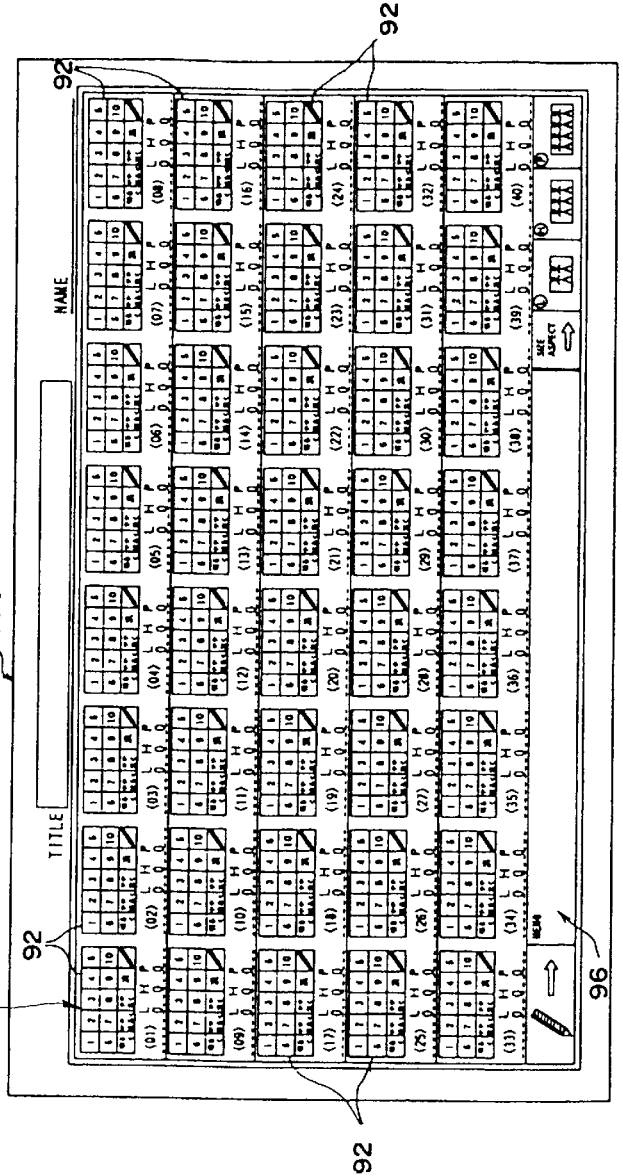
FIG. 20A is a plan view of another order card (the third card)
FIG. 20B is an enlarged view of a portion of FIG. 20A.

As shown in FIG. 20A and FIG. 20B, an order card 46C (third card) is formed in a block-shaped configuration and is formed from the total number of forty blocks 92, five rows in a vertical direction of the paper of FIG. 20A by eight rows in a horizontal direction thereof.

The number of forty blocks 92 is slightly greater than that of image frames which can be recorded within one currently-available negative film. For this reason, the single order card 46C alone can correspond to the single negative film.

Figure 21:
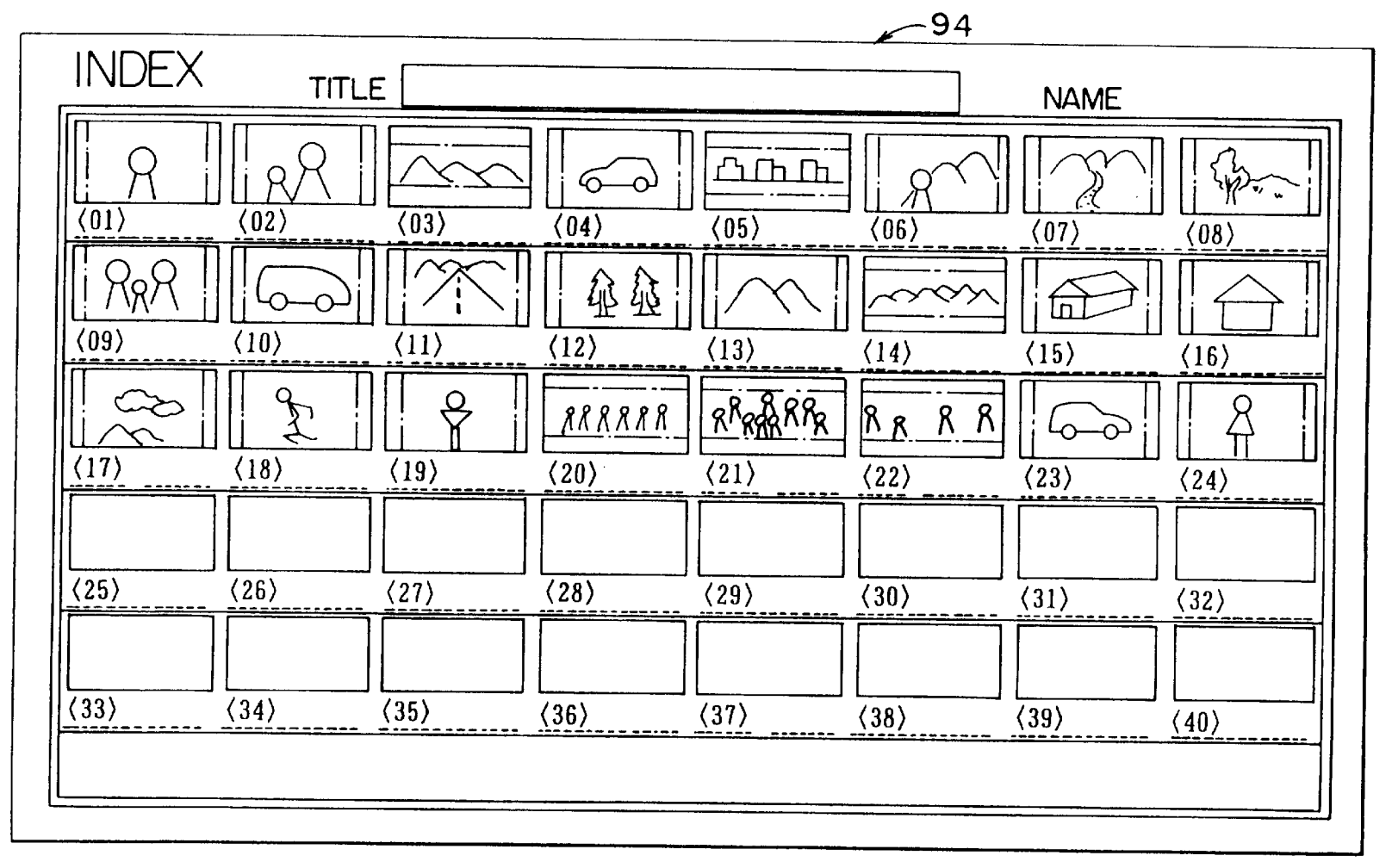

The vertical and horizontal arrangement of these blocks 92 is the same as that of an index print 94 shown in FIG. 21. The index print 94 is to be handed to the customer when a negative film and printing papers at the time of "simultaneous prints" are returned to the customer. Images recorded on one roll of film are all recorded as positive images on the index print 94.

Accordingly, the customer need not confirm the frame number of each image frame. For example, when the customer orders extra prints of a fourth image of the first line of the index print 94, it suffices that the customer specifies the fourth block 92 of the first line on the order card 46C by referring to the index print 94.

Meanwhile, a clearance is provided between each block 92. An area for specifying the frame number and the size of prints at the time of re-order for extra prints is provided at a lower side portion of each block 92.

Each block 92 is further divided into 15 (3 by 5) subblocks. The subblocks of upper two lines are used to specify the number of ordered prints, and each number of figures from 1 to 10 are printed in these subblocks. The customer puts down a mark (for example, a check mark indicated by "v") in any corresponding number, i.e., the number corresponding to the number of ordered prints, so as to specify the number of ordered prints.

On the other hand, the subblocks in each bottom line are used to specify an exposure condition at the time of printing. In these subblocks, "light", "somewhat light", "somewhat dark." and "dark" are respectively printed. Then, in a right end subblock, a drawing of a pencil is printed, which means that a note for matters to be attended to is indicated. The customer can specify the contents to be indicated by putting down a mark in any character or the drawing. Meanwhile, the space 96 of the note for matters to be attended to is provided at the lowermost position of the order card 46C.

The third order card 46C corresponds to the index print 94. The customer can easily designate an image for which the customer desires to re-order by referring to the index print 94. Namely, since the index print 94 shows positive images, an expected image can easily be found out correctly even if similar images are arranged continuously.

Meanwhile, although the blocks 92 are formed in the order card 46C using the same arrangement as that of the images recorded on the index print 94, the order card 46C alone can be used without the index print 94 if the frame number can be confirmed.

Figure 22:
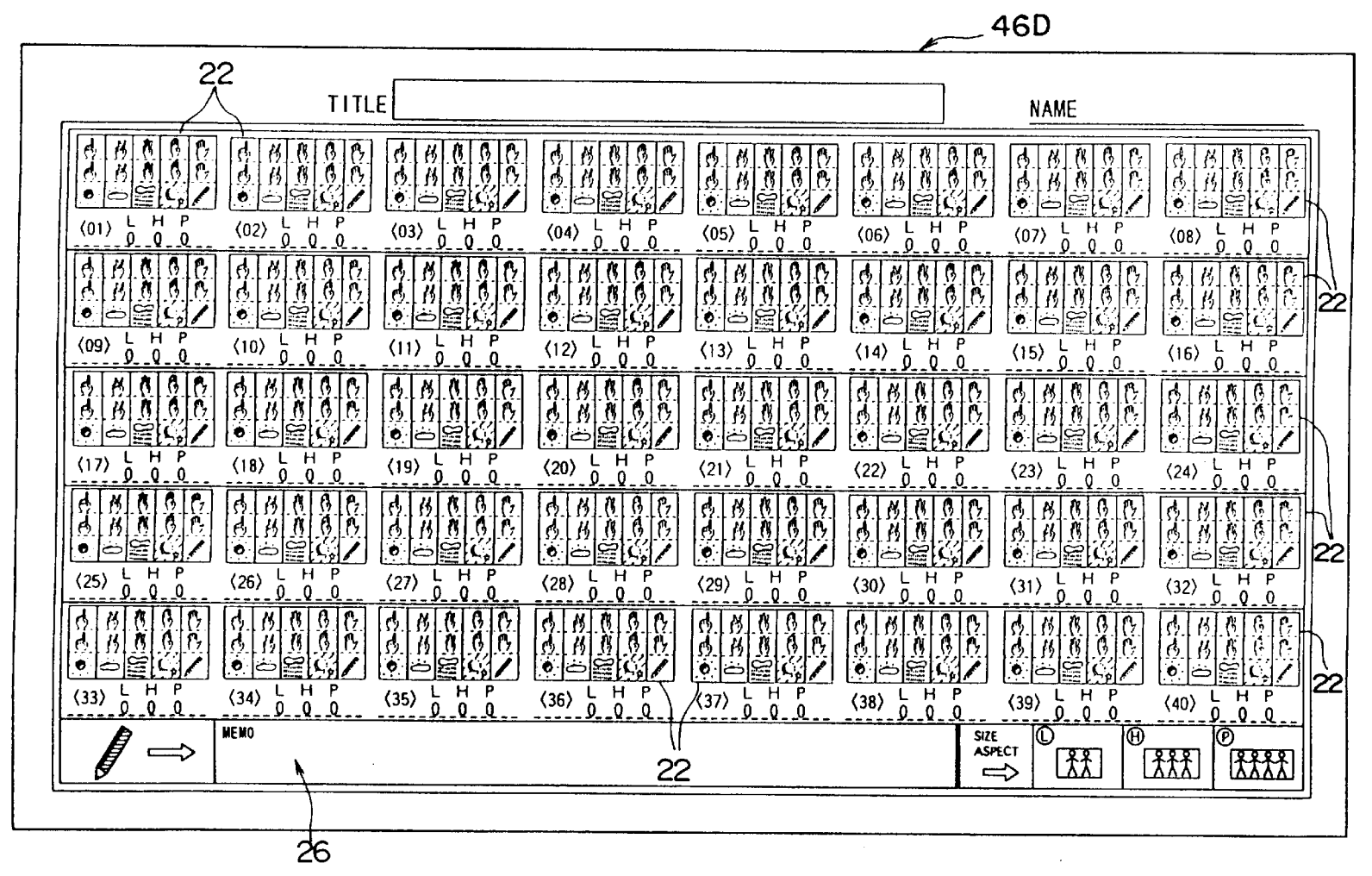

Further, in the third order card 46C, the numbers of figures are respectively printed in the subblocks for specifying the number of ordered prints, and the characters are respectively printed in the subblocks for specifying the exposure condition. However, as shown in FIG. 22, a card 46D (fourth card) may be used in which drawings of fingers are adopted in the subblocks for specifying the number of ordered prints, and drawings representing weather conditions at the time of photographing are adopted in the subsections for specifying the exposer condition.

Meanwhile, for example, when a developed negative film is wound up into a cartridge in an elongated state without being cut every six frames, and is returned to the customer, the customer can easily view the images of the negative film. In this case, the index print 94 is indispensable for a re-order for extra prints as a substitute for the negative film.

As described above, by using the order card, an excellent effect can be obtained that facilitates the customer's order for extra prints and the laboratory's confirmation of the order contents and can prevent occurrence of mistakes of orders and eliminate complication of an operator's operation.

While the embodiments of the present invention, as herein disclosed, constitute a preferred form, it is to be understood that other forms might be adopted.

What is claimed is:

1. An apparatus for accepting an order for photographic processing, comprising:

first reading means for reading information relating to photographic processing, said information being previously recorded on a film brought by a customer who orders photographic processing, or on a container in which the film is accommodated;

second reading means for reading identification information for identifying the customer, said identification information being previously recorded on a recording medium brought by the customer;

issuing means which, using information read by said first reading means and said second reading means, issues at least a first order form to be handed to the customer, said first order form indicating that the order for photographic processing has been accepted, and a second order form used to communicate contents of the order for photographic processing to a laboratory; and third reading means which reads information for specifying an image frame for extra prints, said information being previously recorded on a print order slip brought by the customer when the customer orders photographic processing for extra prints;

wherein said issuing means records the information read by said third reading means, on at least said second order form when the accepted order for photographic processing is extra prints.

2. An apparatus for accepting an order for photographic processing according to claim 1, wherein said print order slip is divided into a plurality of areas in which frame numbers corresponding to respective image frames of a photographic film are given and any symbol or any number corresponding to a number of ordered prints can be entered in each of the plurality of areas.

3. An apparatus for accepting an order for photographic processing, comprising:

first reading means for reading information relating to photographic processing upon placing said order, said information being previously recorded on a film brought by the customer or on a container in which the film is accommodated;

second reading means for reading data upon placing said order, for specifying a customer, said data being stored in a first storing medium brought by the customer;

third reading means for reading a photographic processing condition according to the customer order, said photographic processing condition being stored in a second storing medium;

data filing means for determining an ID code for batching information read by said first, second and third reading means, and filing a series of information on the basis of the ID code;

printing means for printing the information filed in said data filing means; and printing control means for controlling said printing means such that all information corresponding to the ID code can be collectively printed;

wherein said third reading means reads information for specifying an image frame for extra prints, said information being previously recorded on a print order slip brought by the customer when the customer orders photographic processing for extra prints; and wherein said issuing means records the information read by said third reading means on at least said second order form when the accepted order for photographic processing is extra prints.

4. An apparatus for accepting an order for photographic processing according to claim 3, wherein said first reading means comprises a magnetic head for reading magnetic information recorded on a magnetic layer provided on the film, and said first reading means pulls out the film in a state in which the container is mounted to a predetermined position, and causes the magnetic head to correspond to the magnetic layer while conveying the film.

5. An apparatus for accepting an order for photographic processing according to claim 3, wherein said apparatus is installed in a photo processing shop or a laboratory, and a network system for electronically transmitting information by using a communication line is provided between the photo processing shop and the laboratory.

6. An apparatus for accepting an order for photographic processing according to claim 4, wherein said apparatus is installed in a photo processing shop or a laboratory, and a network system for electronically transmitting information through a communication line is provided between the photo processing shop and the laboratory.

7. A method for accepting an order for photographic processing, comprising the steps of:

preparing a predetermined order card divided into a plurality of areas in which frame numbers corresponding to respective image frames of a photographic film are given, and in each of which areas, any symbol or any number corresponding to a number of ordered prints can be entered; and accepting an order for photographic processing of extra prints from a customer in accordance with an ordered frame number and a number of ordered prints which are entered in the predetermined order card.

8. A method for accepting an order for photographic processing according to claim 7, wherein an arrangement of the areas provided in the predetermined order card is the same as that of an index print which is to be handed to the customer together with the photographic film.

9. An apparatus for accepting an order for photographic processing according to claim 1, wherein said second order form is printed.

10. An apparatus for accepting an order for photographic processing according to claim 1, wherein said second order form is electronically transmitted.

11. An apparatus for accepting an order for photographic processing, comprising:

first reading means for reading information relating to photographic processing, said information being previously recorded on a film brought by a customer who orders photographic processing, or on a container in which the film is accommodated;

second reading means for reading identification information for identifying the customer, said identification information being previously recorded on a recording medium brought by the customer; and issuing means which, using information read by said first reading means and said second reading means, issues at least a first order form to be handed to the customer, said first order form indicating that the order for photographic processing has been accepted, and a second order form used to communicate contents of the order for photographic processing to a laboratory;

wherein said issuing means records an expected date of delivery of the order for photographic processing on said first order form and said second order form.

12. An apparatus for accepting an order for photographic processing, comprising:

first reading means for reading information relating to photographic processing, said information being previously recorded on a film brought by a customer who orders photographic processing, or on a container in which the film is accommodated;

second reading means for reading identification information for identifying the customer, said identification information being previously recorded on a recording medium brought by the customer; and issuing means which, using information read by said first reading means and said second reading means, issues at least a first order form to be handed to the customer, said first order form indicating that the order for photographic processing has been accepted, and a second order form used to communicate contents of the order for photographic processing to a laboratory;

wherein said issuing means records a size of completed prints on at least said second order form when the order for photographic processing includes making prints on a printing paper.

13. An apparatus for accepting an order for photographic processing, comprising:

first reading means for reading information relating to photographic processing, said information being previously recorded on a film brought by a customer who orders photographic processing, or on a container in which the film is accommodated;

second reading means for reading identification information for identifying the customer, said identification information being previously recorded on a recording medium brought by the customer; and issuing means which, using information read by said first reading means and said second reading means, issues at least a first order form to be handed to the customer, said first order form indicating that the order for photographic processing has been accepted, and a second order form used to communicate contents of the order for photographic processing to a laboratory;

wherein said issuing means issues a single second order form used to communicate contents of a plurality of orders for photographic processing from a plurality of customers, to the laboratory.

* * * * *